United States Patent [19]

Windebank et al.

[11] Patent Number: 5,096,281

[45] Date of Patent: Mar. 17, 1992

[54] OPTICAL TRANSFORM SYSTEM

[75] Inventors: Robert W. Windebank, Hawleyville; Richard G. Tuck, West Redding, both of Conn.

[73] Assignee: Optical Profile, Inc., Eastsound, Wash.

[21] Appl. No.: 512,575

[22] Filed: Apr. 10, 1990

Related U.S. Application Data

[63] Continuation of Ser. No. 111,780, Oct. 21, 1987, abandoned, which is a continuation of Ser. No. 867,469, May 23, 1986, abandoned.

[51] Int. Cl.⁵ .................. G02B 5/10; B24B 49/05
[52] U.S. Cl. ......................... 359/868; 51/165.71; 359/900
[58] Field of Search ............ 350/104, 607, 608, 629, 350/630, 174, 320; 51/165 R, 165.72, 165.71, 284 R, 283 R, 326, 327

[56] References Cited

U.S. PATENT DOCUMENTS 4,173,036  10/1979  Ferguson ..................... 362/259

FOREIGN PATENT DOCUMENTS 1280074  10/1968  Fed. Rep. of Germany ...... 350/629
2420452  11/1979  France .................. 350/629
WO85/05191  11/1985  PCT Int'l Appl.

OTHER PUBLICATIONS

"Segmented Mirror Polishing Experiment", Robert A. Jones, *Applied Optics*, Feb. 1982, vol. 21, No. 3, pp. 561-564.

"Figure Control for a fully segmented telescope mirror", Terry S. Mast et al., *Applied Optics*, Jul. 1982, vol. 21, No. 14, pp. 2631-2641.

*Primary Examiner*—Bruce Y. Arnold
*Assistant Examiner*—James Phan
*Attorney, Agent, or Firm*—Weingarten, Schurgin, Gagnebin & Hayes

[57] ABSTRACT

Method and apparatus for generating compound shapes in optical surfaces needed to accomodate variable magnification, off-axis projection, reflection from diverse surfaces, reflector relay, intensity pattern requirements and other complex optical transform functions. The present invention permits the realization of mirrors of which provide a variable magnification. The surface generation capabilities permit controlled magnification changes that nevertheless are still image forming and typically avoid the human eye focussing difficulties normally associated with variable magnification mirrors. The present invention includes a computer driven, reflector design system which permits the designer to see the field of view, ray tracings, reflected beam intensity pattern and other data pertinent to a variable magnification mirror from entered mirror specifications. The effect of changes in specifications can be rapidly determined and a final design achieved through one or more such reiterations. The system further determines machine tool motional controls for grinding a surface corresponding to the entered mirror specifications. The capability of the invention in producing irregular optical shapes for these applications is utilized for the production of mirrors that accomplish complex focussing functions for use in off-axis projection mirrors, relay mirrors, and headlamp reflector mirrors. According to the invention, optical systems capable of accomplishing such complex focussing can be realized with a single reflector.

36 Claims, 17 Drawing Sheets

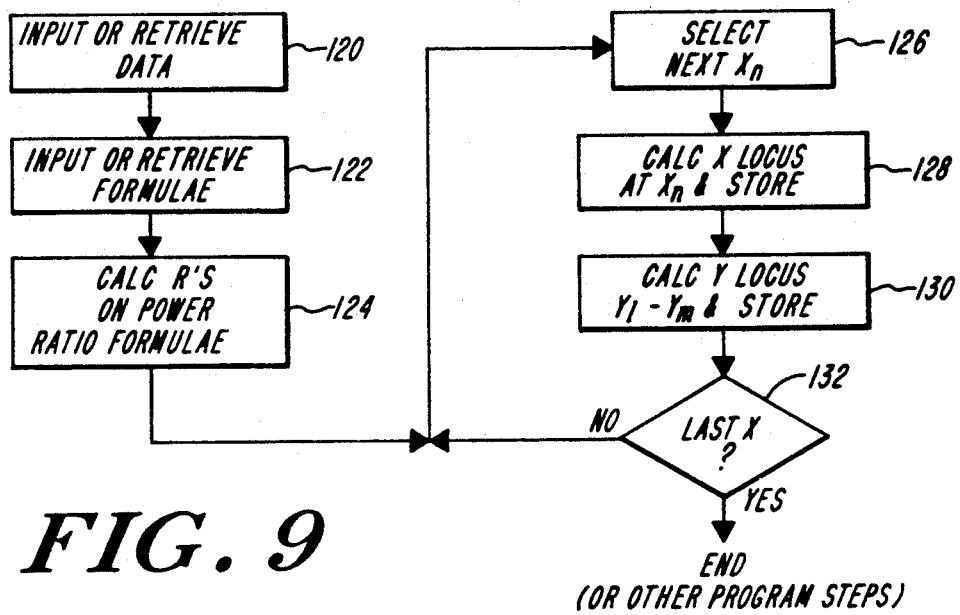

*FIG. 9*

X START, ΔX, XMAX
Y START, ΔY, YMAX
X RADIUS MIN, X RADIUS MAX
Y RADIUS MIN, Y RADIUS MIN.
X CENTER, Y CENTER, SAG
SCALES FOR (SCREENS, CUTTING TOOL)
DELAY, CUT RATE, ACCEL / DECEL
CLOCKWISE / COUNTER CLOCKWISE

*FIG. 11*

FORMULA ENTRY

SHAPE "1" FORMULA : X BOUNDARIES : Y BOUNDARIES
SHAPE "2" FORMULA : X BOUNDARIES : Y BOUNDARIES
 .
 .
 .
SHAPE "n" FORMULA : X BOUNDARIES : Y BOUNDARIES

SHAPE "1" POWER RATIO FORMULA
SHAPE "2" POWER RATIO FORMULA
 .
 .
 .
SHAPE "n" POWER RATIO FORMULA

*FIG. 12*

OPTICAL TRANSFORM SYSTEM

This application is a continuation of application Ser. No. 07/111,780, filed Oct. 21, 1987, which is abandoned and which is a continuation-in-part of U.S. patent application Ser. No. 867,469 filed May 23, 1986, now abandoned.

FIELD AND BACKGROUND OF THE INVENTION

The present invention relates to complex reflectors, and their fabrication, for use in applications requiring unusual shapes, typically other than a single conic section, while providing image forming optical effects for viewing or projecting images correctly and in focus or intensity profiles in a desired pattern.

One application of such mirror is in the field of rear view automotive mirrors. It is desirable, and to some extent required by regulation, to be able to see a wide angle of view in the rear view. This is often accomplished by the provision of a convex rear view reflector. At the same time it is of advantage to be able to see certain portions of the rear field of view with nearly unity magnification, while wider views are needed as well so that car positions in all rear locations affecting passing and lane change decisions are easily known. To achieve these goals mirrors of variable magnification have been used. This is accomplished either by affixing a convex mirror at some location on a unity magnification mirror, or by varying the magnification across the mirror width. The former produces two different views and it is difficult for a driver to assimilate both instantaneously, keeping in mind the relative magnifications of each. The latter causes one eye of the human observer to view the scene at a different magnification than the other eye. The result is that the two see different size images and superposition of them in the mind is far from perfect, creating an unclear view. If it is additionally desired to relay the image to the interior of the vehicle for viewing at an interior display, such as adjacent the interior rear view mirror, the optical problems become severe.

In addition, the definition of the shape for a variable magnification mirror is not readily achieved since the mirror does not fall into one of the traditional conic section shapes. This makes it difficult and expensive to produce such mirrors. Accordingly, where mirrors are desired with odd shapes, for example for headlight lamp reflectors that accommodate a bulb of finite dimensions, and asymmetrical targets the trend is to adopt only one shape, limiting design flexibility.

In headlamp reflector design it is further necessary to project an illumination beam in a required intensity pattern. The generation of a single reflector to accomplish this in the past has not been practical, requiring instead the use of a conventional shape, such as paraboloid, in combination with a complex refractor pattern in the lens.

Other applications where special shapes could be used to advantage include off-axis overhead projectors where tilt compensation would permit projection of a properly proportioned image using a single reflector. Projection of TV images or of information in a head up display could also profit by the use of such mirrors. Indirect interior and exterior lighting would also benefit by the use of such reflectors. Many other applications require complex optical or electromagnetic transformations.

SUMMARY OF THE INVENTION

According to the teaching of the present invention, there are provided a computer based method and apparatus for the formation of mirrors of varying magnification in compound shapes and the mirrors thus formed. The invention includes a computer driven mirror shape definition system which permits interactive formation of a mirror from input specifications with online modelling of the resulting mirror field of view, intensity profile or other characteristics so that the designer can revise the mirror specifications until a desired mirror characteristics is obtained. This system permits the designer to reiteratively adjust mirror shape with ease, simplifying achieving the desired results. With each revision, the mirror shape is changed to a different shape that will yield new optical characteristics. Once the desired characteristics are realized, the system will machine a metal blank with a specular surface having the corresponding mirror shape. Mirrors can then be molded from this shape. This gives the designer a powerful tool for meeting desired design criteria.

In this manner a rear view mirror can be obtained with a desired variation in magnification. The center of the mirror may thus be provided with a near unity magnification while the periphery is given a far lower magnification, producing image condensation and field of view expansion at the edges. The shape generated by the computer is controlled so that the effects of the viewer's eyes seeing an object through the mirror with different magnifications does not create eye confusion that otherwise results from the use of varying magnification reflectors.

The present invention's capability for generating compound shapes in reflectors is used to generate mirror systems with the feasibility of relaying an image from an outside vehicle mirror to an interior mirror where it is presented to the viewer with the advantages of variable magnification. Moreover, the present system permits the realization of optical systems that provide, in a unitary mirror, a head-up display by reflection from the windshield, an optical system that corrects off-axis distortion in reflective projection arrangement such as are encountered in overhead projectors and projection TV and off-axis microwave reflection in a radar antenna.

The reflector definition and generation techniques of the present invention are used to produce a complex mirror that illuminates a field from a source with a prescribed intensity pattern. Many other applications are possible as well.

DESCRIPTION OF THE DRAWING

These and other features of the present invention are more fully described below in the solely exemplary detailed description of the invention and accompanying drawing of which:

FIG. 9 is an algorithm representing computer processing steps for generating mirror surface describing parameters according to input specifications for the mirror;

FIG. 11 is a listing of input parameters for specifying a mirror shape;

FIG. 12 is a listing of formula input steps for identifying describing formulae for each segment of a compound mirror according to the present invention;

DETAILED DESCRIPTION OF THE DRAWING

The present invention contemplates the formulation of a mirror operating as an optical transformation surface to provide a transformation between a field of view and a desired presentation of that field of view to an observer or as the transformation between a source and an intensity pattern. As used herein the term optical is intended to apply to all appropriate portions of the electromagnetic spectrum. In particular the present invention presents a system for computer definition of mirrors within a computer according to a set of input specifications and for graphically presenting the transformation on the field of view provided by those input parameters under computer control such that a mirror, to produce a desired transformation, can be rapidly designed. The computer control system further provides for machine center controls that will machine a metal surface to the mirror shape that produces that transformation.

Figure 1:
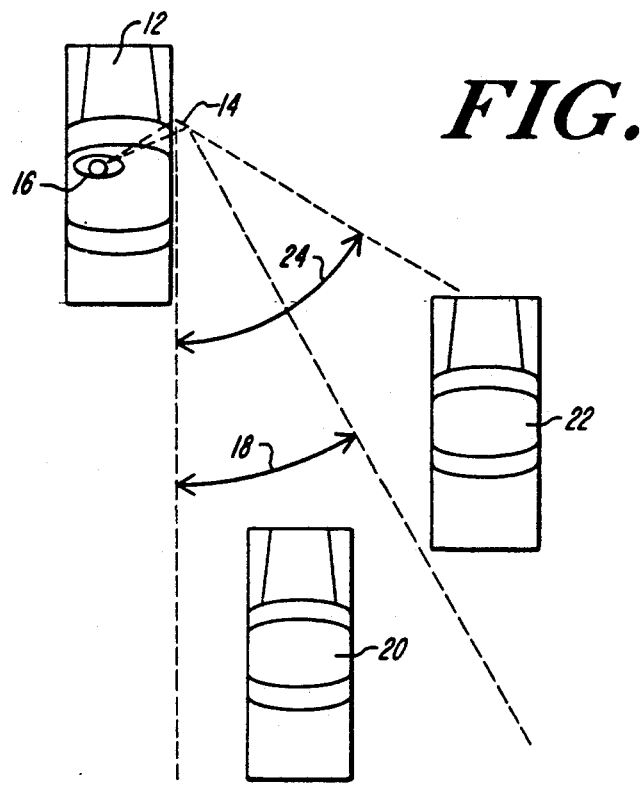
FIG. 1 is a diagram illustrating the application of the present invention to rear view mirrors.
Figure 2:
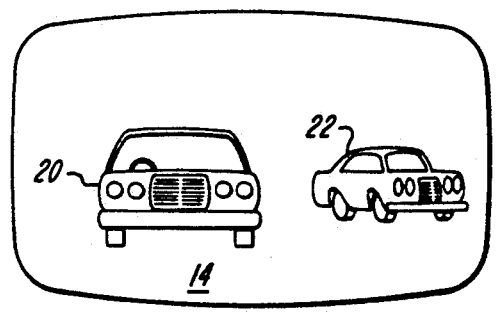
FIG. 2 is a pictorial view of images in a rear view mirror in the conditions of compound mirror shape involving variable mirror magnification.

The present invention finds one important application in the field of rear view mirrors for automotive vehicles. As illustrated in FIG. 1, it is typically desired that a vehicle 12 have a right rear view mirror 14, or left rear view mirror as the case may be, which is viewed by an observer 16 to perceive an object or vehicle 20 within a rear field of view 18. It may, however, be desirable also to provide to the observer 16 a broader field of view 24 encompassing an additional vehicle 22 in a more rightward travel lane but still in a position where its presence is of importance to the observer or driver 16 of the vehicle 12. As illustrated in FIG. 2, the view in the mirror 14 should include a presentation of the vehicle 20 in a form which permits the observer to readily perceive the location and speed characteristics of that vehicle. This requires that the portion of the mirror 14 in which the vehicle 20 is presented have a relatively near unity magnification scale so as to not distort distance and other characteristics. With a near unity magnification, however, it is difficult to design a mirror 14 of reasonable scale which will at the same time provide an image of the vehicle 22, whose behavior and positional characteristics are also of importance to the driver or observer 16. In the prior art, this is accomplished by changing the magnification of the mirror 14 towards its outer or right most portions so that it tends to become more wide angle, and "smallifying" at the outer right extremities, permitting the presentation of the vehicle 22 within the field of view.

Such mirrors thus require a variation in the magnification factor across the surface, making for a complex and costly mirror shape, difficult to produce in the prior art. Accordingly, many mirror designs include a mirror 14 having a unitary magnification scale across the surface but including a second mirror portion, adhered to the outer extremities of the mirror 14, which provides a substantially below unity magnification to accomplish wide angle viewing. Such multiple view mirror produce a confusing image to the driver, requiring an unnecessarily long view time in order to perceive the information desired.

Alternatively, where the mirror surface 14 is a unitary mirror having a changing magnification factor, it is difficult to design a mirror which both accomplishes an adequate rear view angle and at the same time prevents a viewer confusing condition known as bilateral disparity.

Figure 3:
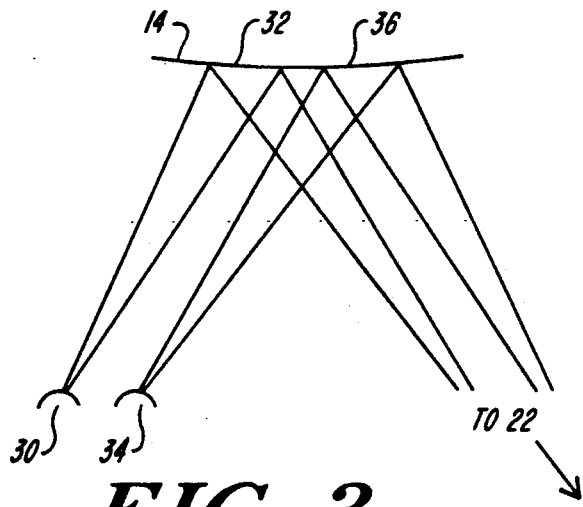
FIG. 3 is a diagram of the light path typical encountered in rear view mirrors between a rear field of view and the observer.

Bilateral disparity is illustrated with respect to FIG. 3 which shows the mirror 14. The vehicle 22 is perceived by the observer's left eye 30 by reflection from a portion 32, while it is perceived by the observer's right eye 34 by reflection from a portion 36. If the mirror 14 is designed with a variable magnification, decreasing outwardly, the view perceived by the two eyes 30 and 34 will be of different size and possibility different shape. The two images perceived by the two eyes will not superpose upon each other readily, creating further viewer confusion and distraction from the essential information flow for safe, efficient vehicle operation. The design of variable magnification mirrors thus becomes a complex task if bilateral disparity and adequate field of view considerations are both addressed properly.

The power and flexibility of the present mirror generating system is useful in addressing such complex mirror problems by permitting previewing of mirror optical transform characteristics within the computer environment while at the same time specifying mirror characteristics in a manner which ensures the avoidance of such problem as bilateral disparity. In order to understand mirrors and the system for their generation according to the invention, it is useful first to view a mirror surface, such as the mirror surface 40 of FIG. 4, as a matrix of mini mirrors 42 with boundaries which typically intersect in orthogonal horizontal lines 46 and vertical lines 44. Each of the different mini mirrors 42 may have the same or different formulae describing their shape, such as spheres, hyperboloids, paraboloids, etc. In addition, each mini mirror may have a surface varying according to one formula in the vertical direction, such as spherical, while it varies in the horizontal direction according to a different function, such as elliptical, parabolic, or hyperbolic, to name only a few. Each mini mirror may typically measure 0.01 inch on a side. In order to completely understand the two principle curvatures at any point, one must understand the two principle directions at the point as well as the curvature. These characteristics allow for data for ray tracing.

By dividing the mirror surface 40 into a multitude of mini mirrors 42 it is possible to accomplish a tapering of the surface or an adjustment between one magnification scale at the center and a substantially different magnification scale at the periphery by a gradual transformation in magnification scales from mini mirror to mini mirror in that direction.

Figure 5:
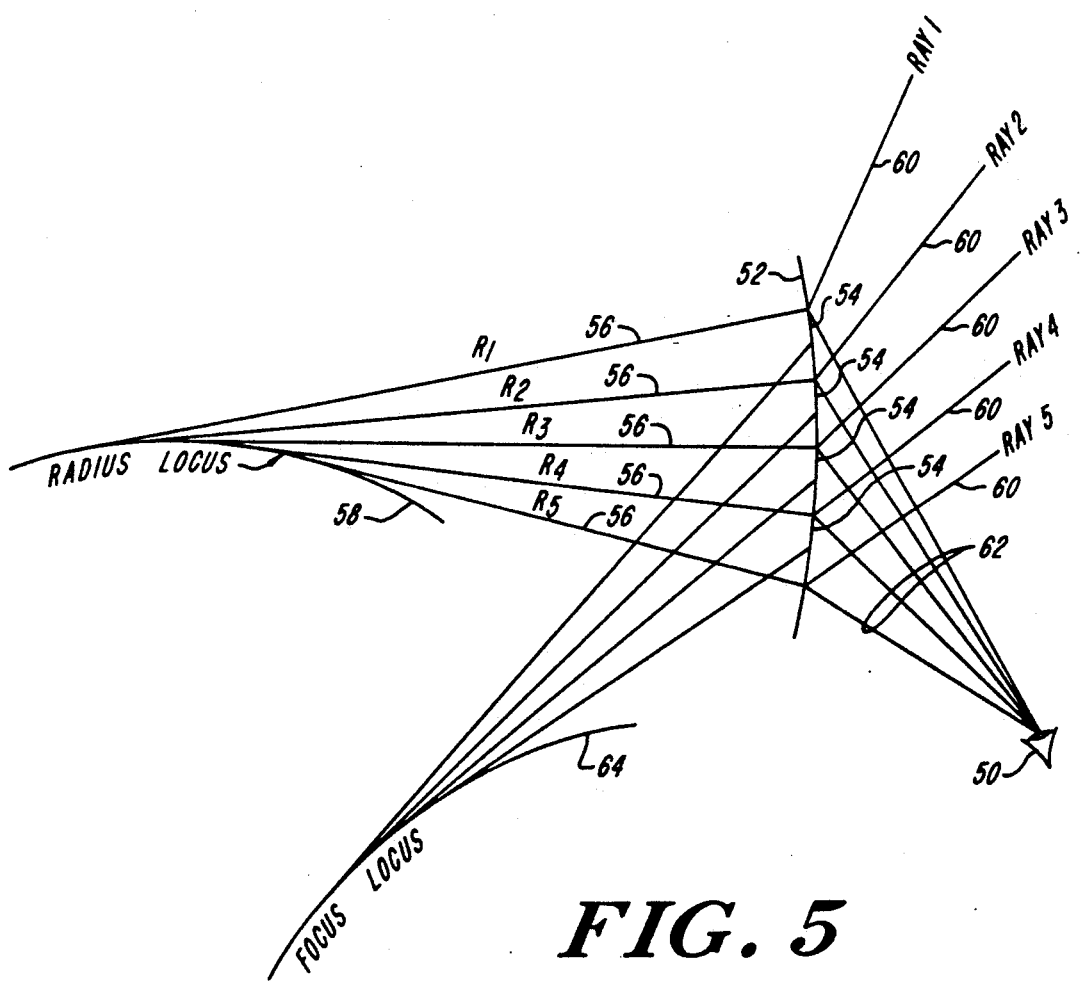
FIG. 5 is a ray diagram useful in explaining mirror generation according to the present invention.

It is not adequate, however, to merely assemble mini mirrors of differenting magnifications or describing shapes together without some control over their edge to edge transitions. Otherwise the resulting image perceive through such a mirror would be chaotic. In order to understand the design criteria which permit such mini mirrors to be assembled to provide a coherent, clearly perceived specular reflection, it is first necessary to understand the dynamics of reflections in the manner presented in FIG. 5. As shown there, an eye 50 of an observer views a mirror 52 which, in the two-dimensional view of FIG. 5, can be perceived as having a plurality of mini mirrors 54. At any point on the surface of a mirror 54, a line tangent to that point in one direction will have a unique orthogonal vector. If that vector has a length corresponding to the radius of the circle or sphere of curvature having the surface curvature variations at the point of tangency, that radius vector can be used as a describing parameter for the mirror at that point. In FIG. 5 a plurality of radius vectors 56 are drawn, one for each boundary of each mini mirror 54. The termination of these radius vectors away from the mirror, i.e., at the center of the radius of curvature at each point between mini mirrors, will describe a radius locus 58 which represents the change in position of the centers of the circles of the mirror curvature at each junction between mini mirrors. In order to provide a coherent image for the observer eye 50 it is essential that the radius vectors for each mini mirror 54 as they approach their point of contact, lie along the same line, although the radii distance from each adjacent mini mirror may be of a different length. The same constraints are required of all mini mirror adjacent boundaries in both directions. If this criteria is met, the mirror will present to the observer eye 50 a sensible image.

FIG. 5 also illustrates the rays of light from points within the field of view of the mirror 52 as seen by the observer eye 50. The rays 60 represent light from point sources to the eye 50 as reflected from each junction between mini mirrors 54. At that point, the angle between each ray 60 and the corresponding radius 56 will be the same as between the reflected light ray 62 to the observer 50 with respect to the corresponding radius vector 56. This is simply a restatement of the optical rule that angle of incidence equals angle of reflection. Since the mirror surface 52 has a curved surface, it will have associated with it a focus. Since each mini mirror 54 has typically a different magnification characteristic, the focus point for each mini mirror 54 for radiation incident along the rays 60 will be different, defining a locus 64 for the focal points.

Figure 4:
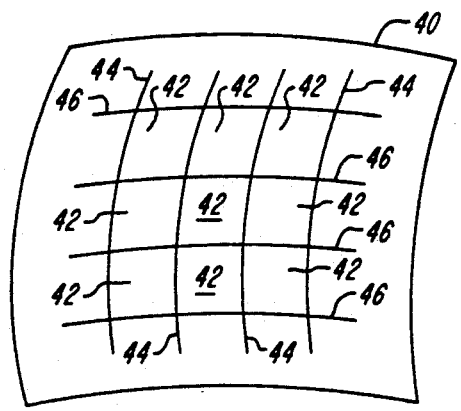
FIG. 4 is a view of a mirror surface useful in explaining the generation of mirrors according to the present invention.
Figure 6:
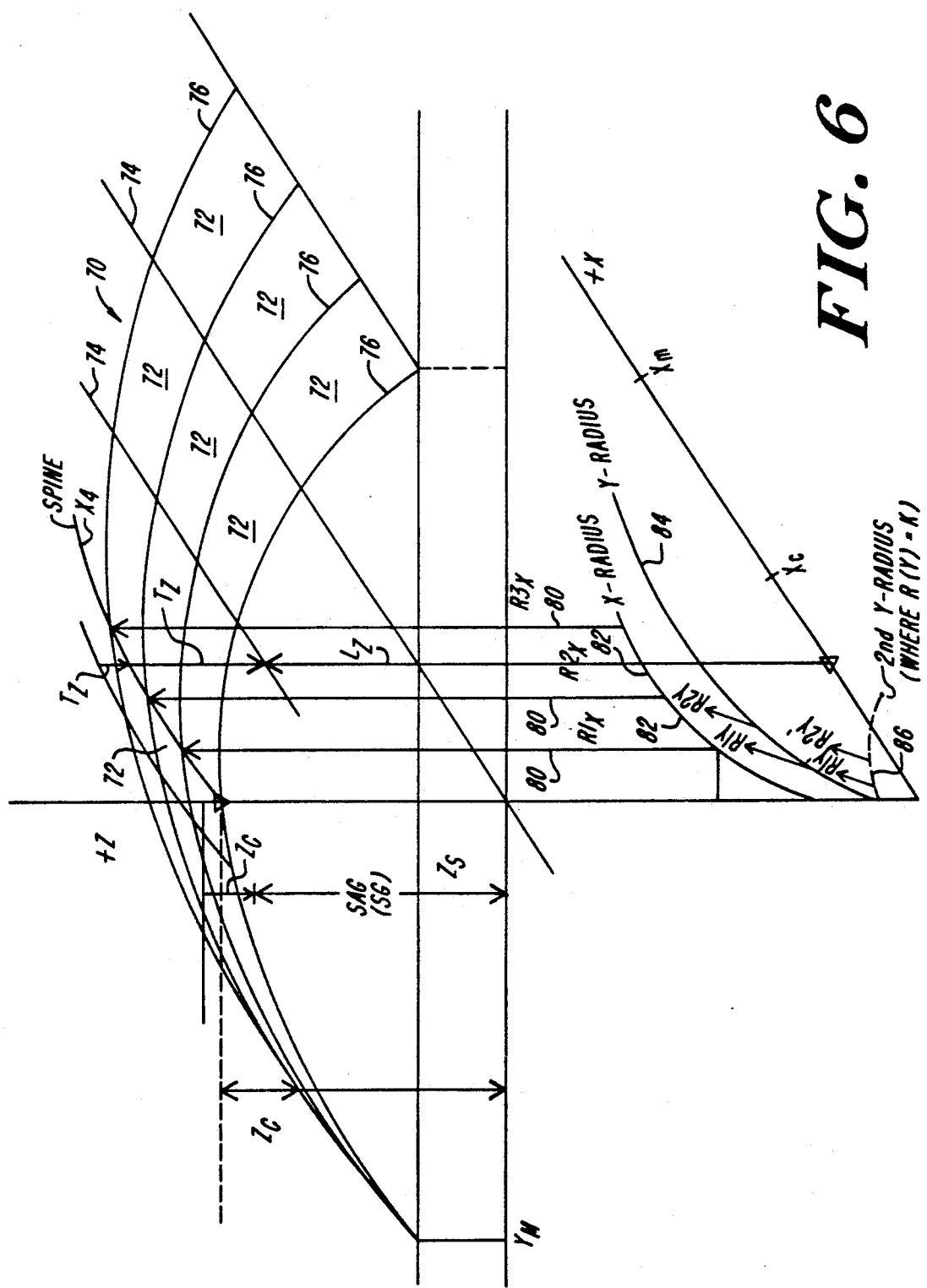
FIG. 6 is a graphic three-dimensional representation of a mirror illustrating parameters used in generating mirrors according to the present invention.

The teaching of FIGS. 4 and 5 is now applied to FIG. 6 in which a three-dimensional view is presented of a portion 70 of a mirror. The mirror portion 70 is divided again into a plurality of mini mirrors 72 by the intersection of grid lines 74 oriented in the X or horizontal direction and grid lines 76 oriented in the Y or vertical direction, if applied to an erected rear view mirror. For purposes of design, however, in the view of FIG. 6, the X and Y axes lie in the horizontal plane and the Z axis represents the vertical direction. For purposes of mathematically describing the mirror portion 70, one of the X direction grid line 74 will be identified as the "spine" of the system. The spine grid line 74 may or may not lie within the actual mirror portion 70 to be designed by the system. The characteristic of the spine line 74 is that it intercepts the Z axis at zero Y displacement in the mathematical frame of reference. In designing a mirror portion 70 for use as a rear view mirror, and noting that the X axis in the properly positioned mirror will be along the horizontal direction, it can be perceived that in proceeding along the spine or any other X grid line 74, the magnification or curvature of the mirror will change from mini mirror 72 to mini mirror 72, typically becoming progressively more curved to accomplish a reduced magnification, and enlarged field of view, as one proceeds outward in the Y direction along the grid line 74. As a result, the radii of curvature will decrease in increasing Y direction as illustrated by radius vectors 80 which in turn define an X radius locus 82. Each of the radii are labelled $R1_X$, $R2_X$, $R3_X$ ... to represent radii for the mirror curve extending in the X direction and corresponding to progressively farther out mini mirrors in the X direction.

There will similarly be a locus 84 for the radii, $R1_Y$, $R2_Y$..., for mirror curvature along the grid lines 76 proceeding from one mini mirror 72 to another mini mirror 72, in the X direction. This will be the case even though each of the grid line 76 represents a constant radius of curvature in the Y direction.

If alternatively, the grid lines 76 change their magnification in the Y direction, there will be a third locus 86, extending substantially in the Y direction, which represents the changes in radii $R1_Y'$, $R2_Y'$, for each outwardly extending mini mirror 72 along the Y axis.

The diagram of FIG. 6 illustrates also the maximum and center positions along the X and Y axes for the mirror portion 70 as a further frame of reference. These parameters, along with the sag parameter representing the maximum Z displacement for machine tool purposes, are referred to elsewhere throughout the description and in the computer algorithms as part of input data. For simplicity, the number of mini mirror 72 is far less than in a real typical mirror.

As noted above, the design criteria which permits a mirror surface 70 to be generated in space and provide for coherent understandable reflection of the field of view is that the radii at all adjacent points between grid line 74 and 76 lie along the same vector, although of different length. The computer system to be described below can assemble a mirror surface 70 in space, using the radius vectors, or the X, Y, Z coordinates of each center of curvature at the termination of the radius vectors along the low side 82, 84 and 86 and knowing the two principle curvatures at the center and the two principle directions. With these parameters stored, the entire mirror surface is prescribed and various calculations can be performed to determine or to provide simulated fields of view, ray tracing, and other functions.

Figure 7:
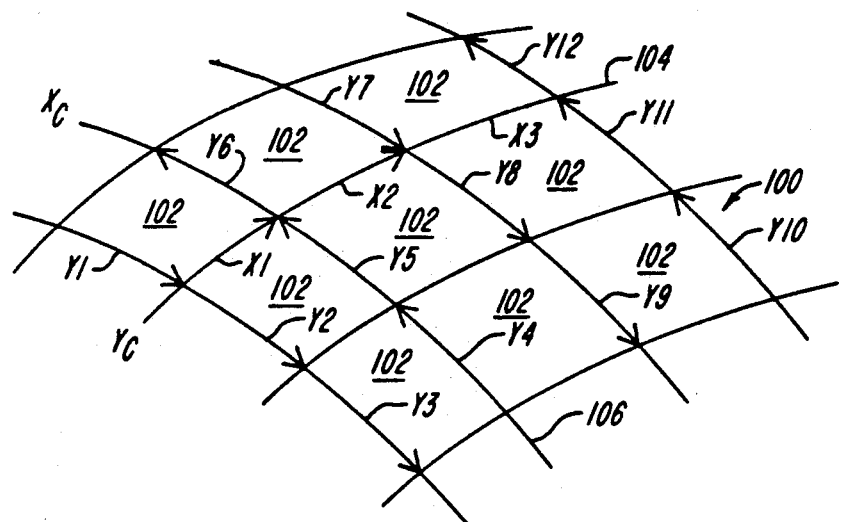
FIG. 7 is a diagrammatic view of a portion of a mirror surface illustrating the mathematical expression of mirror surface parameters according to the present invention.

The manner in which the surfaces are actually computer generated from the input parameters, to be described in detail below, is illustrated in general with respect to FIG. 7. In FIG. 7 a mirror section 100, composed of a plurality of mini mirrors 102, is shown with a spine 104 proceeding in the X direction through the mirror 100. The spine 104 forms the YC or Y center grid line while the grid line 106 provides the X center or XC grid line. In constructing the mirror portion 100, the computer first receives the maximum, minimum and center X and Y coordinates for the mirror in the frame of reference of FIG. 6 as well as the range of radius variation in both the X and Y directions from a minimum to a maximum. Additional information regarding scale factors for display and other purposes will also be added. In addition, the computer requests that describing formulae for each boundary between mini mirrors 102 be entered. This can become an extremely complex function involving many different formulae. As will typically be the case for the rear view mirror, each Y direction grid line will be identified as having a circular characteristic of constant radius in the Y direction but of progressively decreasing radius in the X direction. Finally, the system has specified to it the size of each mini mirror 102 as a step size in both X and Y between changes in curvature describing characteristics or formulae, typically each step size is 0.01 inch.

With this information, the computer then proceeds to determine the R or radius vectors in a logical sequence, first proceeding from minimum or starting X position and minimum or starting Y position along a Y grid line to the maximum Y position as illustrated by the curved segments Y1, Y2, and Y3 in FIG. 7. The system then proceeds to make a single X direction step, identified as X1 in the drawing, to switch to the next grid line in the Y direction. It then proceeds, for convenience, from the Y maximum position in the steps Y4, Y5, and Y6 to the Y minimum position and makes another X step, X2, to the third Y grid line. It then proceeds from Y minimum through step Y7, Y8, and Y9 to Y maximum. The process repeats through a subsequent X direction step, X3, and Y direction steps, Y10, Y11, and Y12, and so on.

The illustration of FIG. 7 greatly simplifies the number of steps and mini mirror size for purposes of description only. In practice it is likely that each mini mirror will be far smaller and many steps utilized in achieving the full traversal of both the Y dimension and the X dimension across the surface of the mirror. The process of curve generation in proceeding from each step YI to YJ involves relatively simple mathematical relationships by simply generating in space each Y curve according to the previously entered formula describing it and positioning it according to the constraint that the radius vector at its beginning point lie along the same vector as the radius vector of the previous Y curve at its ending point. This allows the successive step approach of FIG. 7 to fully construct a curve from the simple input configuration of X and Y positions, X and Y step sizes and curve describing functions in the X and Y direction along each mini mirror. With the surface described in this manner, it is possible using other programming of the present invention, to identify the transformation characteristics of the mirror by ray tracing, field of view simulations or otherwise as described below.

Figure 8:
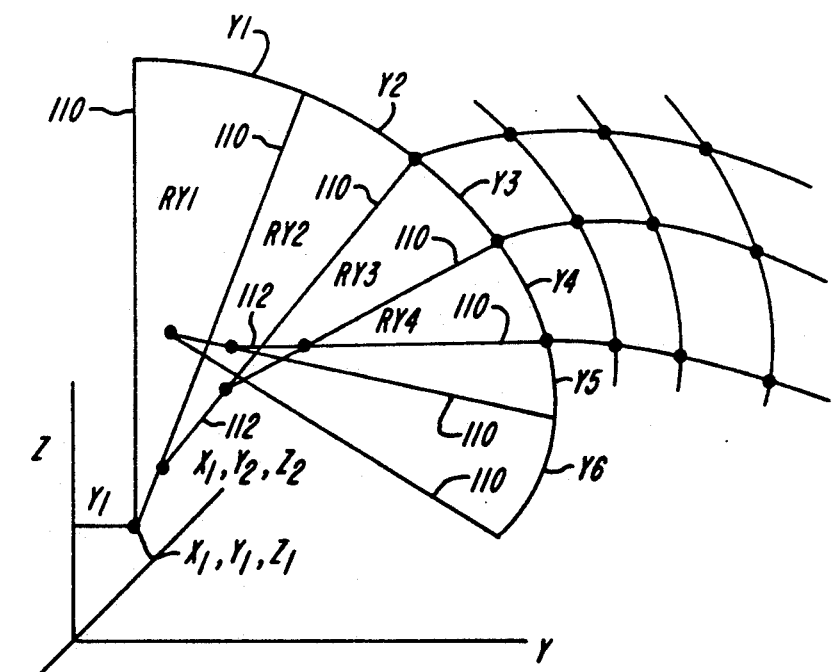
FIG. 8 is a locus of points representing surface describing parameters as generated for a mirror according to the present invention.

In building the curve using the step by step approach of FIG. 7, a set of radius vectors or describing parameters will evolve as illustrated in FIG. 8. As shown there, for each of the segments, Y1 ... Y6, a separate radius line 110 will be generated for the boundaries between the segments. There will evolve a locus for that radius vector, as well as two possible other vectors as illustrated above. That radius vector 112, may not necessarily be a simple shape, and will, for example, represent an arrow head configuration as illustrated by the locus 112 where the radius of curvature in proceeding along steps Y1 ... Y6 first reduces and then increases. It is to be noted that the radius vectors may be identified by X, Y, Z coordinates of their locus 112 and a length and direction or terminus at the mirror as illustrated in FIG. 8 to provide a complete set of describing parameters for each leg of each mini mirror.

FIG. 9 illustrates the basic calculation algorithm provided by the computer surface generation system of the present invention in accomplishing the functions illustrated in FIGS. 7 and 8. With respect now to FIG. 9, the basic computer algorithm for determining a mirror shape, in terms of the radius vectors as illustrated in FIG. 8, in the sequence illustrated in FIG. 7 is shown. The algorithm includes an initial state 120 during which the particular mirror parameters, including the X and Y min, center and maximum values, the X and Y radius range, the X and Y step size and, as applicable other data to be described below are entered. In a subsequent state 122 the formula describing the curves for each mini mirror in both X and Y direction are similarly entered. Alternatively the data required for states 120 and 122 may be obtained from computer files or from keyboard entry by an operator.

In state 122 are also entered formulae identifying the manner in which the radius change from its maximum to minimum values over the mirror range can occur. In the case where it is desired to minimize the effect of bilateral disparity it is desired to place a limit upon the rate which the radius can change from one mini mirror to another so as to avoid the disparsity of vision effects. For that purpose a formula is entered which contours the rate of change. As a figure of merit the rate of the radius should be allowed to change to avoid bilateral disparity. One implementation of this is found in lines 740 to 900 of accompanying Attachment A, a computer program implementing in part the FIG. 9 methodology in the context of a machine tool control system.

In the subsequent state 124, utilizing the power ratio formulae discussed above, the mini mirror to mini mirror radius ratios for the entire mirror are calculated. In subsequent state 126 the next, or initial, X step is taken and subsequent state 128 calculates for that X position the locus of the center of the radius of curvature for the arc tangent in the X direction at that point and stores it in memory. At the subsequent state 130 the computer steps through the entire Y dimension of mini mirrors at the X step and calculates the Y radius loci or the locus of the center of curvature for arc's tangent in the X direction at each Y point, and to the extent that there is variation in the Y direction, the locus for the R radius vectors for curves tangent and the Y direction and places them in computer memory as well. In subsequent state 132 a decision is made as to whether the entire X dimension of the mirror has been assembled using these states and if not processing proceeds back to state 126 where the next Y grid line, indexed one step in the X direction, is selected and the process of states 128 and 130 repeated until the entire mirror surface is complete. In practice, to avoid use of a large memory, the system may use the data from each pass for display, print, plot, or machining functions before stepping to the next Y line, avoiding intermediate memory use.

At this point the computer has generated the complete set of radius vectors which specify the entire mirror surface and the normal vectors for ray trace functions. It is either stored or used on line as described below. In the accompanying Attachment A, computer programming steps 1200-2700 are one example of the calculations provided by states 128 and 130 in the case where spherical mini mirror segments are involved and there is no change in radius of curvature in the Y direction for any X displaced Y grid lines.

Figure 10:
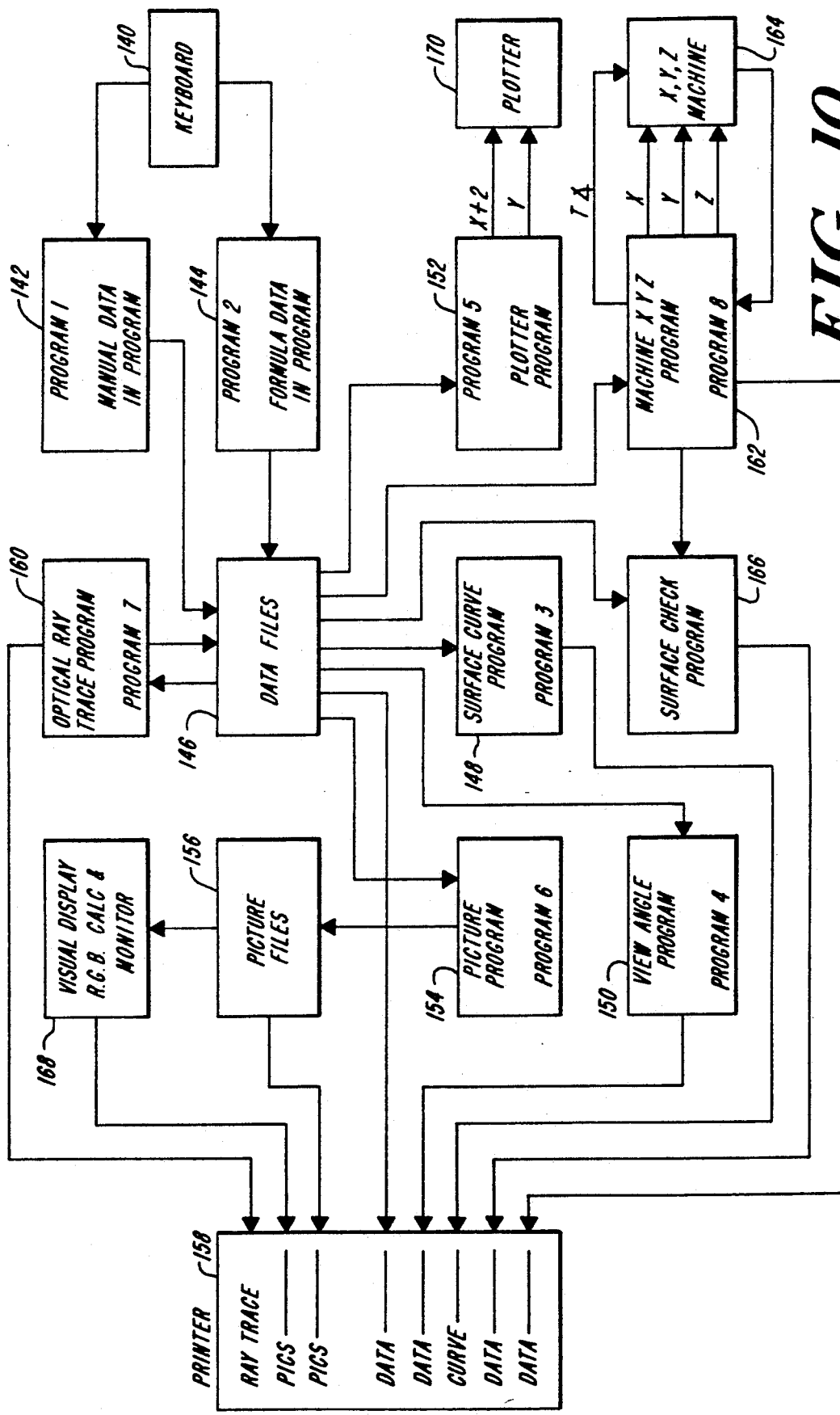
FIG. 10 is a general diagram of computer processing operations selectively available in practicing the present invention for the design of mirror and their fabrication according to the present invention.

The power and versatility of specifying and generating a mirror surface contour utilizing the methodology of FIGS. 7, 8 and 9 is the flexibility that is obtained in simulating various mirror transformation functions utilizing a set of selectable programming steps in a repertory of available simulation tools. An exemplary such repertory is illustrated in FIG. 10 which represents a computer program and data system permitting evaluation of performance of the mirror designed in accordance with the generation techniques of FIGS. 7-8. The repertory of programs illustrated by FIG. 10 provide for: graphical presentation of anamorphism of the mirror, that is the difference in radius of curvature across the surface in both horizontal and vertical directions; viewing the change in vertical and horizontal view with position across the mirror; a two-dimensional plot representative of actual mirror surface; a simulated view of a predetermined, or sequence of predetermined, fields of view in the mirror; a ray tracing function of the mirror between source and object locations; and finally the ability to generate tool control signals from specified mirror parameters to control a machining center to produce a machined metal surface corresponding to the mirror surface with a specular reflection characteristic matching that of the designed mirror. With reference now to FIG. 10 there is shown a data entry keyboard 140 which is useful in either a manual data entry program 142 or a manual formula data entry program 144 which respectively input mirror describing parameters and formulas of the type described above with respect to FIGS. 7-9. A central data file memory location 146 is used to store parameter and formula data as well as other generated mirror describing radius parameters as described elsewhere in the application. Among the various simulation programs, a surface curve program 148 is available to operate on data from the files 146 or entered through the keyboard 140 to plot a graph indicating mirror anamorphism as described below. A view angle program 150 is also available in the ensemble to FIG. 10 for providing a graphical representation of the vertical and horizontal extent of viewing provided by the mirror. A plot or program 152 is available to act on the data in the files 146 for the purpose of generating a two-dimensional representation of the actual mirror surface contours on a platter 170. A picture program 154 operates on the supplied mirror describing data to present the portion of a rear field of view entered by data through the keyboard 140 seen in the mirror according to its specified characteristics. These views may be stored in sequence a plurality of views, representing moving traffic, in a picture file memory 156 where they may be sequentially displayed via a computer screen 168 or a printer 158. A selectable program 160 provides optical ray tracing between an observer and a field of view via a mirror from the mirror specifying input data and the radius vector data calculated therefrom. A machine control program 162 is similarly operative on the mirror specifying information and the calculated radius data to provide X, Y, Z control over a machining center 164, described below and optionally to provide tilt control so as to maintain a predetermined relationship between machine cutting tip and the mirror surface being produced. A surface check program 166 is available to confirm the mirror surface characteristics by running a gram probe over the surface and checking the positional correspondence.

FIGS. 11-26 present the algorithmic operation of the various programs available in the repertory of FIG. 10. Throughout those figures the basic calculations provided by the algorithmic processing of FIG. 9 are used as a component of the algorithm illustrated and rather than reproduce the entirety of the algorithm of FIG. 9, its operation has been summarized by a single step. Attachment A represents a completer program for the machine program 162 including all the basic calculation and data entry components illustrated in FIG. 10. It uses circular mini mirror curvature formula as well as a nonvarying radius of curvature in the Y direction for the tangent curve oriented in the Y direction. This means that there is no locus corresponding to locus 86 in FIG. 6.

FIG. 11 illustrates the programming for data entry during which the data files 146 are loaded with information available for the other programs indicating X and Y start or minimum and terminal or maximum values, the magnitude of the step in both directions corresponding to the mini mirror dimensions, as well as the range of maximum to minimum radius for both curves oriented in X and Y directions. Additionally, the X center, Y center dimensions to indicate the spine and the sag parameters which represents the maximum depth of cut of the machine tool are entered. Additionally, there will be inputs which are computer or machine dependent to provide scale factors. Also information will be supplied indicating the delay desired between machine steps, the machine velocity of cut and acceleration and deceleration profile information in order to minimize mirror distortion resulting from inertial displacements in changing tool speed. Finally input information is provided respecting the clockwise or counter clockwise mirror curvature, defining either a convex or concave surface. This same information is represented as input requests in the Attachment A.

FIG. 12 represents the operation of the program 144 for entering formulae. This may be entered either into a data file in which the program will access it for each mini mirror step, as it steps through the sequence illustrated in FIG. 7, or can be directly entered into the program itself depending upon operator's convenience. The formula entry will represent the curvature along both the X and the Y boundaries of the mini mirror. In addition, power ratio formula, one or more depending upon whether it is desired to change the manner in which the radius of curvature between mini mirrors changes over different portions of the mirror may be entered.

Figure 13:
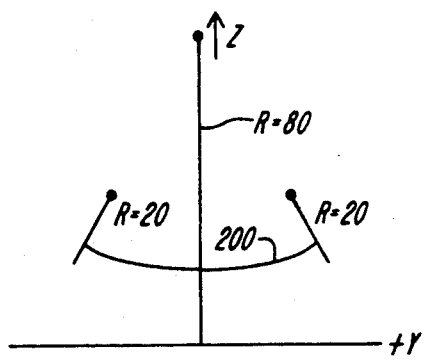
FIG. 13 is a simplified view illustrating the manner in which multiple formulae specifying a compound mirror surface are operative.

By way of example, FIG. 13 illustrates a mirror section 200 extending in the Y direction in which the radius of curvature varies from 80 at the center towards 20 at each end. In such a case a formula for each half of the mirror sections 200 for both shape and power ratio formula could be used, although it might be desirable to break the curve up into several additional formulas providing spherical curvature near the higher radius of curvature values and, for example, some other conic section in the periphery.

Figure 14:
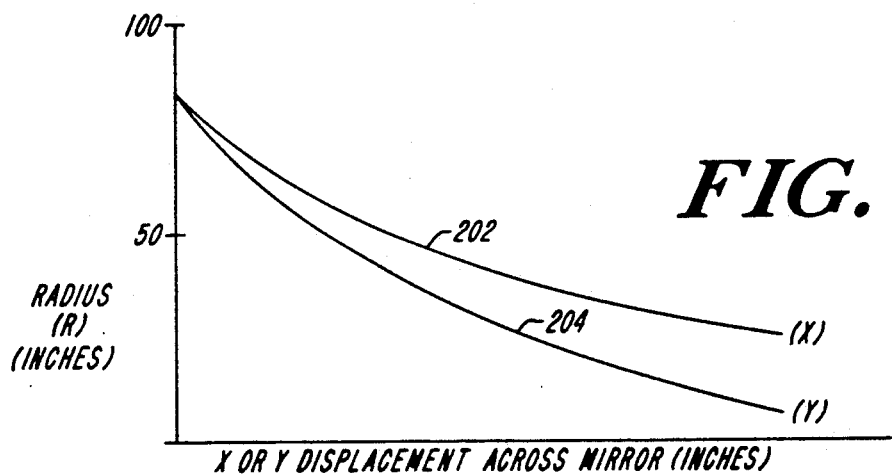
FIG. 14 is a graph describing mirror anamorphism developed from processing according to FIG. 10.

FIG. 14 illustrates the operation of the surface curve program 148 which provides a graphic output on the printer 158 of the radius of curvature of the mirror as a function of both X and Y displacement. The curves 202 and 204 for X and Y displacement radius variations, by being plotted together, indicate the anamorphism of the mirror, that is the degree to which it curves more rapidly in one direction than the other.

Figure 15:
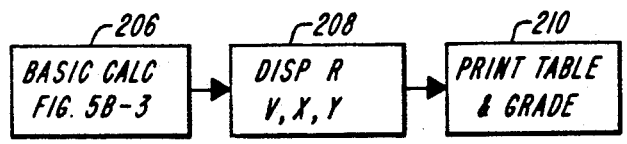
FIG. 15 represents an algorithm for producing the anamorphism graph of FIG. 14.

To produce the plot of FIG. 14, an algorithm illustrating in FIG. 15 is utilized. The basic radius vector information is produced in an initial step 206, utilizing the algorithm illustrated above with respect to FIG. 9. This information, provides directly the R magnitudes as a function of X and Y and accordingly a subsequent step 208 produces a display, or optionally in a step 110, a printout, of the variation in radius with X and Y as illustrated in FIG. 14.

Figure 16:
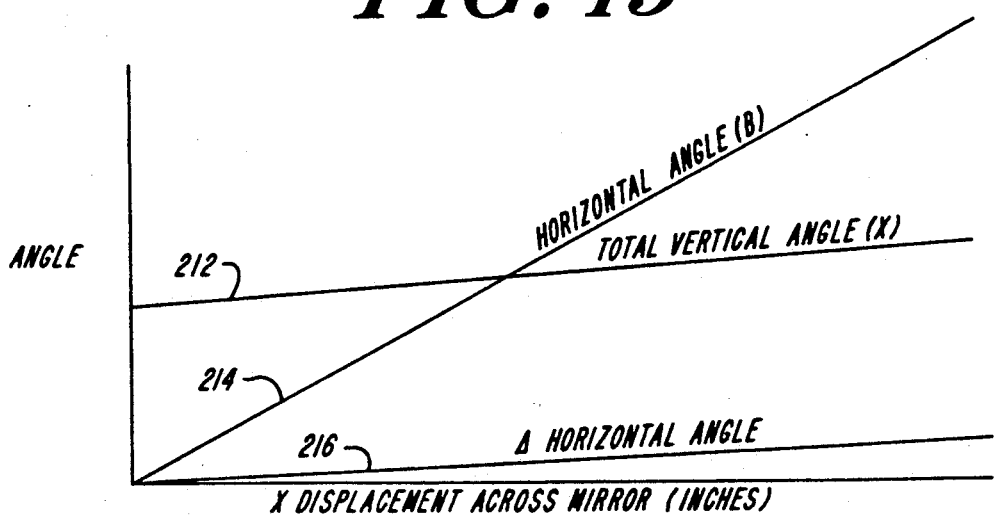
FIG. 16 is a graph describing view angle characteristics of a mirror according to FIG. 10 processing.

FIG. 16 illustrates the variation of view angle X or Y position on the mirror as determined by the view angle program 150. The graph of FIG. 16 either as a printed or displayed output, provides three curves, the first 212 represents total vertical angle of view as a function of X, a curve 214 presents the horizontal angle of view, represented as angle beta illustrated below with respect to FIG. 17 while a curve 216 represents the change in horizontal angle with position.

Figure 17:
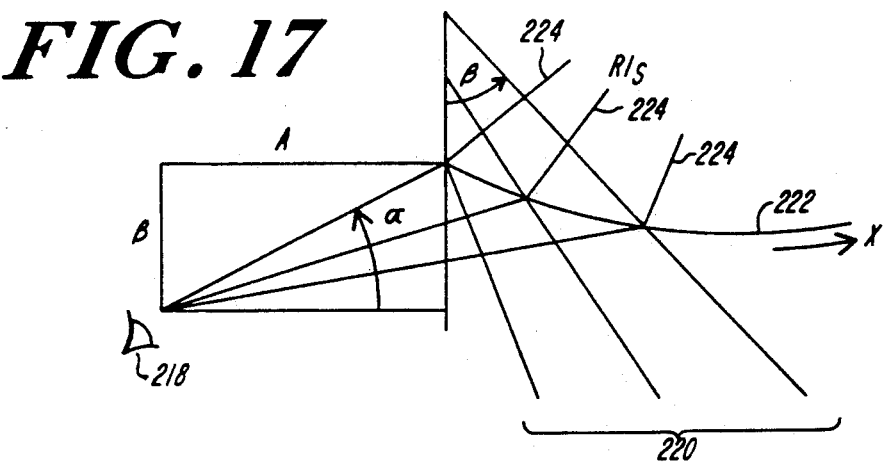
FIG. 17 is a diagram illustrating parameters used in providing view angle graphing of FIG. 16.

To explain the nomenclature of FIG. 16, FIG. 17 presents a ray diagram illustrating a tracing of rays from an observer's eye 218 to a field of view 220 by reflection from a mirror 222 having specified radii of curvature 24 at various points along the surface. The angle beta is the angle between the front and back directional plane of the vehicle (in which the observer's eye 218 is located) and the ray from that eye to particular points in the field of view 220 as a function of X displacement along the surface of the mirror 220. The curve 214 becomes increasingly steep, indicating that the curve 216 is not constant but has an increasing positive value and further representing the face that with X direction across the mirror surface 222, the field of view expands, the magnification decreasing and the radius of curvature decreasing as well.

Figure 18:
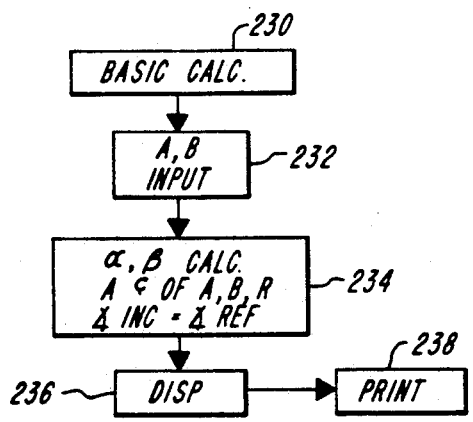
FIG. 18 is a flow chart of computer steps used in producing the view angle graph of FIG. 16.

FIG. 18 represents the processing steps to produce the curves of FIG. 16 from the basic radius vector calculations produced initially in a step 230. A subsequent step, or initial step 232, is used to enter the dimensions identifying the location of the eye 216 with respect to the mirror 222, the A and B dimensions of FIG. 17. A subsequent step 234 calculates the alpha and beta angles represented by FIG. 17 using the known theorem that the angle of incidence is equal to the angle of reflection. For example, at each point of a mirror where a ray, having an angle alpha from the eye 218 intercepts the mirror, there will be a reflected ray having an angle to the appropriate radius vector 224 the same as the angle formed between the incident ray and the radius vector. By then adding the angle of the radius vector relative to the front-desk plane of the vehicle, the angle beta can be determined. Step to step differences are used to produce the curve 216 from this. The curve 212 is readily produced using the same technique to determine beta at the top and bottom of the mirror in the Y direction and to find their difference, that difference being the curve 212. The resulting graphical information can be displayed in a step 236 or optionally printed in a step 238, typically both outputs would be desired.

Figure 19:
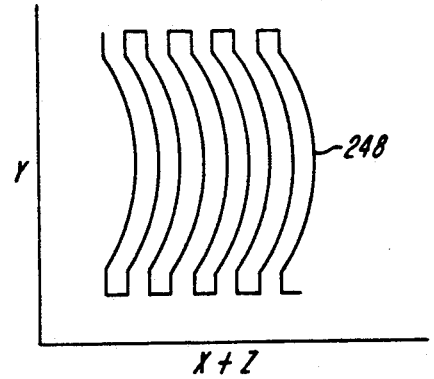
FIG. 19 is a graph describing surface three-dimensional characteristics on a two-dimensional plane.
Figure 20:
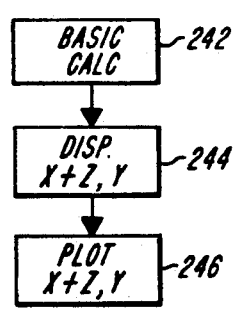
FIG. 20 is a computer algorithm for producing the graph of FIG. 19.

FIG. 19 presents a graphical plot representative of the plot produced by the plotter 170 from the plotter program 152. This program essentially provides an X, Y plot in which the X axis represents the sum of X and Z across the mirror surface. FIG. 20 illustrates the operation the program 152 to produce this plot output, and utilizes a step 242 to produce the basic calculations indicating the R vectors, from which the location of the mirror surface as the outer mirror surface termination of each radius vector. With this data representing the location of the mirror in X, Y and Z, a subsequent step 242 sums the X and Z parameters for each X and Y location and, in step 246, produces the curve 248 illustrated in FIG. 19.

Figure 22:
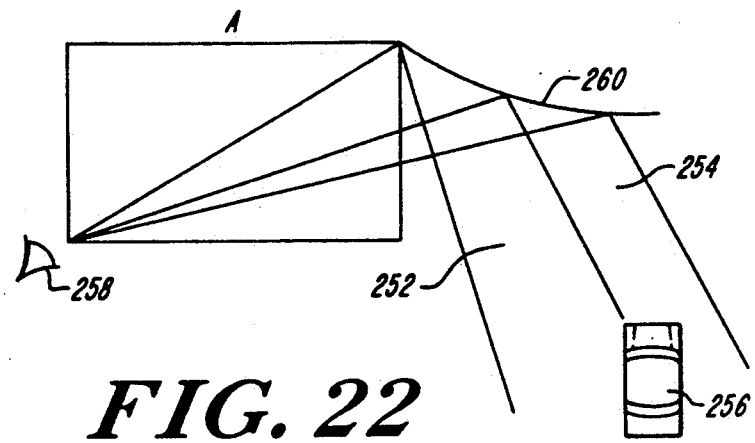
FIG. 22 is a diagram illustrating parameters used in producing the view of FIG. 21.
Figure 21:
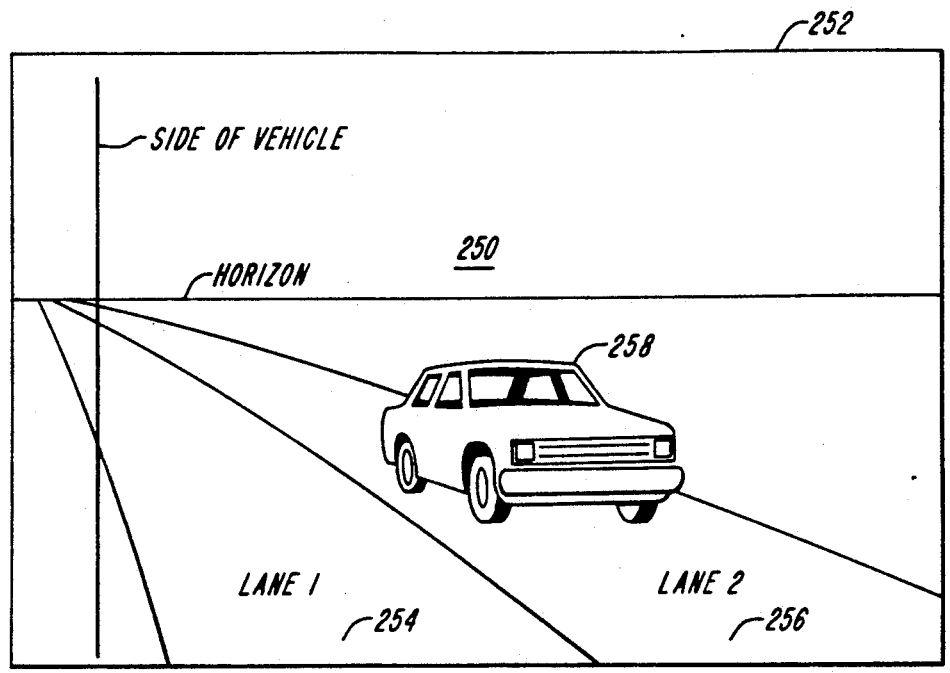
FIG. 21 is a computer generated, simulated view of a rear view mirror field of view using processing of FIG. 10.
Figure 23:
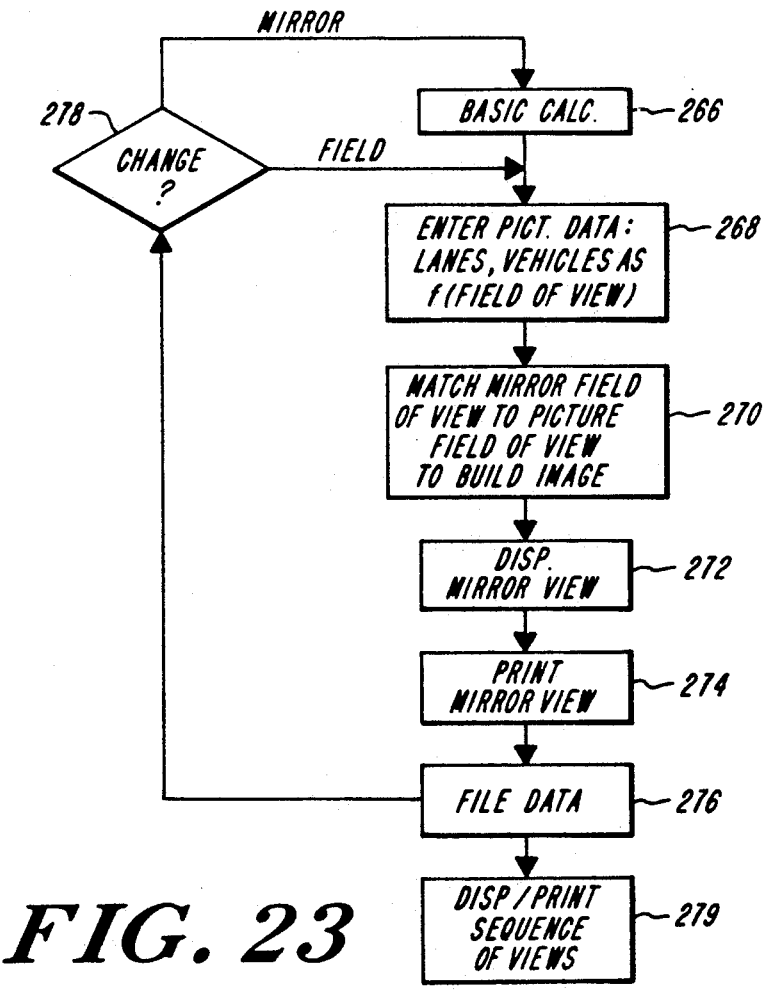
FIG. 23 represents computer processing used in assembling and presenting the mirror view of FIG. 21.

FIG. 21 illustrates the operation of the picture program 154 to produce a display or printed output representing a scene 250 as seen in a simulated rear view mirror 252 given input parameters representing, for example, first and second lanes 254 and 256 and a vehicle 258 located towards the right rear of the operator's vehicle. FIG. 22 illustrates the geometry involved in which the first and second lanes 252 and 254 and vehicle 256 are perceived at different view angles by an observer's eye 258 by reflection from a simulated mirror 260, using the A and B dimensions noted above. The algorithm utilized to provide this simulated field of view is illustrated in FIG. 22. A step 266 is used to provide the basic calculations for a mirror shape from input specifying parameters which identifies the radius vectors for the entire mirror surface. A subsequent step 268 is used to input picture data representing the lanes and vehicles as a function of a normalized field of view from a location of a mirror 260. A subsequent step 270 divides the field of view into small segments and matches the boundaries of that segment with the boundaries of each mini mirror specified in the simulated mirror 260 to determine for each mini mirror which segments of the field of view will be shown. Appropriate rotation is introduced as well. The graphic information from the field of view is thus mapped onto each mini mirror location of the simulated mirror 260 and that information stored in the computer files for subsequent display as the screen simulating the view 250 of the mirror 252. The graphic mapping routine of step 270 uses a conventional techniques, of the type often found in video games, and requires no further description to those skilled in the art. With the data thus assembled for transforming the field of view onto the surface of the mirror 260, a subsequent display step 272 accesses that information from memory, or raster memory depending upon the computer system used, and drives the display with that data. A subsequent routine 274 can be used to provide a printed output, corresponding to the material presented in FIG. 21.

It is at this point that the power of the present mirror design system is of particular value. The information produced is stored in a data file in a step 276 and the entire system can branch back to a decision step 278 from which either the field of view data can be changed by proceeding to step 168 or the mirror parameters changed by proceeding back to the data entry or formulae entry portions of the basic calculation step 266. In this manner the field of view of a simulated mirror can be checked against different scenes and against different mirror parameters. A sequence of simulated views can be placed in the data file at step 276 for a sequence of rear view scenes, representing, for example, the approach of traffic in the operator's rear view field of view and displayed in sequence to represent a realistic driving scenario. Alternatively, the data files can hold a sequence of different simulated views for different mirror configurations to help the designer determine an optional configuration given the particular width of view desired, and given the specific contraints of the vehicle including, the distance between the operator's eye 258 and the mirror 260 in FIG. 22.

While the reiterative nature of the processing represented and described above with respect to FIGS. 21, 22 and 23 provides particular power to the system in permitting actual visualization through a simulated image, it should be noted that the same iterative procedures are useable in all the other repertory of programs in FIG. 10.

Figure 24:
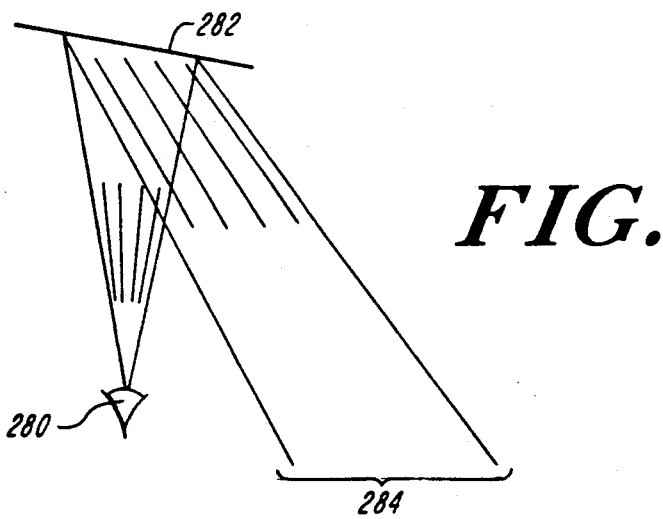
FIG. 24 illustrates a ray trace produced according to the programming of FIG. 10.
Figure 25:
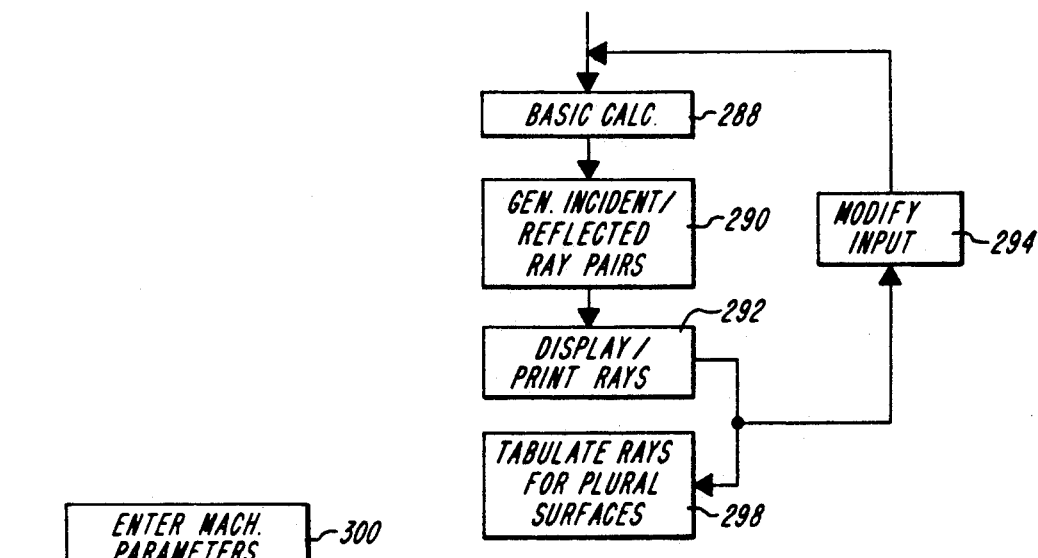
FIG. 25 is a flow chart illustrating the generation of ray traces of the type illustrated in FIG. 24.

In FIG. 24 there is a graphic representation of a typical ray trace program tracing rays from an observer's eye 280 along rays, reflected by a mirror 282, to a field of view 284. The ray trace graph of FIG. 24 provides a convenient elevation or overhead view of the actual view width provided by a mirror 282. FIG. 25 illustrates the algorithmic programming for the program 160 to provide this function. In particular, from the basic calculation of radius of curvature vectors provided in a step 288, a subsequent step 290 generates incident and reflective ray pairs from a specified eye location 280 using the A and B parameters noted above. A subsequent step 292 provides for a display or output print of the rays as illustrated in FIG. 24. From this step input data can be modified in a step 294 to produce a whole new field of view. After several views have been assembled, a tabulation step 298 can present the data for several views in table form permitting comparison side by side of different approaches.

Figure 26:
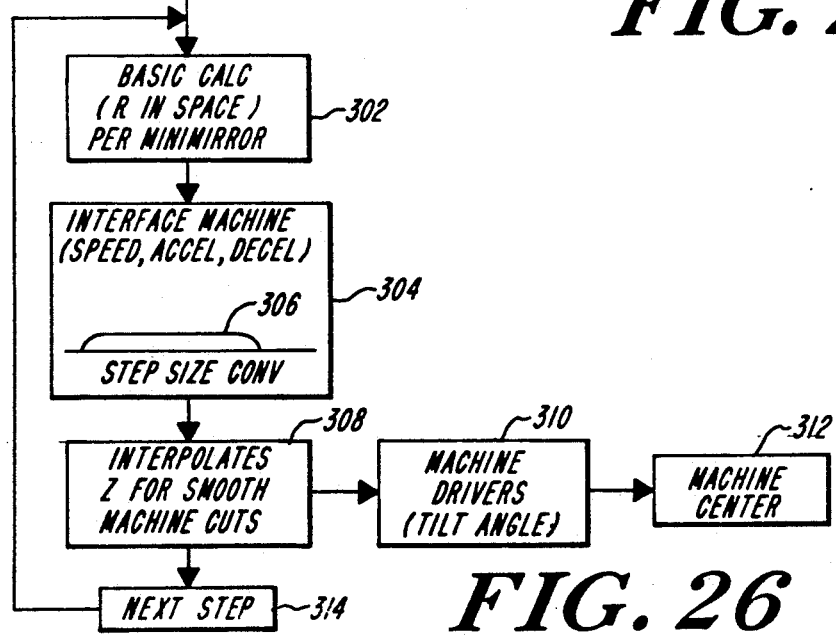
FIG. 26 represents computer processing used for driving a machine tool system according to the programming of FIG. 10 for machining a metal surface to a prescribed compound shape.

FIG. 26 provides the algorithmic operation of the machining program 162 in driving the machining system 184 illustrated below in FIG. 27. In FIG. 26, an initial step 300 is typically provided to enter input parameters particular to the machining center, such as those listed in the last few lines of FIG. 11, to the extent that they may not have been entered previously in the programs of FIG. 10. Thereafter the basic calculation steps are provided in state 302. These identify the R vectors and accordingly the X, Y, Z coordinates of the entire surface of the mirror, along the mini mirror boundaries. A subsequent step 304 sets up the machine center for its velocity, and acceleration and deceleration parameters, typically to provide some form of acceleration or deceleration contour as illustrated in curve 306. Step 304 also identifies step size conversion between mini mirror step sizes and machine tool system step or motor configurations to produce the desired overall physical dimensions for the mirror.

A subsequent step 308 provides an interpolation within steps to smooth out the Z function within a mini mirror. The Attachment A represents one form of interpolation routine in steps 3760 through 4660, through it is to be recognized that other interpolation routines to provide a smooth curve fit across the mini mirror may be utilized. Subsequently, a state 310 provides software drivers for the specific machine tool center 312, providing format, polarity and other consistencies required by the machine tool center 312. Additionally, the machine center 312 may include a cutting tool tilt mechanism in which case the machine driver 312 provides a tilt control in order to orient the tool, typically so that it is orthogonal to the mirror surface being machined at each point of contact. This step simply requires an alignment between the direction of the radius vector at each point and the orientation of the machine tool, utilizing the structure described below with respect to FIG. 29. Subsequent to this state 308, a reiterative step 314 branches the procedures back through the basic calculation routine of state 302. Typically the processing between states 302 and 314 is arranged to occupy one complete Y direction sweep across the mirror, indexing back one step in the X direction to repeat the process for the next Y sweep occuring in alternate directions across the surface of the mirror. This saves memory in that the entire profile and control instructions for a completer mirror, and the mini mirrors of which it is composed, need not be stored at any one time in memory.

Figure 27:
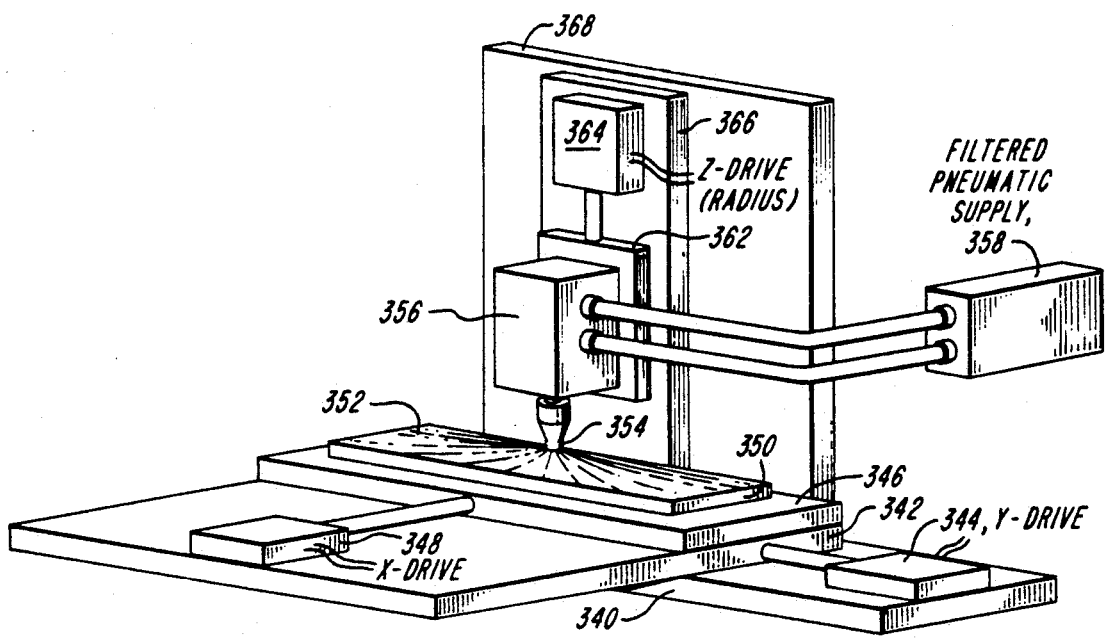
FIG. 27 is a simplified pictorial view of a machine center for producing a compound mirror shape under computer control using the programming of FIG. 10.

FIG. 27 is a diagrammatic pictorial view of a typical machining center for use in practicing the present invention. As illustrated there, a bed 340 contains a Y directional carriage 342 driven by a Y drive mechanism 344 under computer control. An X direction carriage 346 is placed on top of the Y direction carriage 342 and is driven by an X direction drive 348. On top of the Y carriage 346, or intermediate support structure, is a material, typically an aluminum blank 350 which is to be machined to provide a mirror surface 352 under computer control. A machining bit 354 is chucked in a high speed rotator 356 which is pneumatically suspended by a pneumatic supply 358 via supply lines 360. The supply 358 is typically heavily filtered in order to avoid any contaminants in the pressurized fluid drives the rotator 356. Typically the rotator 356 is intended for very high speed rotation, typically in the order of 70,000 rpm. This high rotational speed in conjunction with the use of diamond tips for the bit 354 produces a zero friction grinding effect which avoids any surface reaction from the motional grinding effect of the bit 354. This permits the surface to be very accurately machined to produce a specular reflecting surface directly from machining. Other types of tips may be used for the bit 354 depending upon the material being machined. In addition, an electric discharge machining (EDM) center may be substituted for the mechanical machining system shown above, with the same positional controls operating. The EDM center is particularly useful in machining hard steels. Also positive and negative blanks may be produced and used to create mirrors by pressing.

The rotator 356 is mounted on a Z direction carriage 362 which is driven in the Z direction by a Z drive 364 under computer control. This Z direction carriage 362 travels on a vertical support plate 366 mounted to a back plane support base 368.

Figure 28:
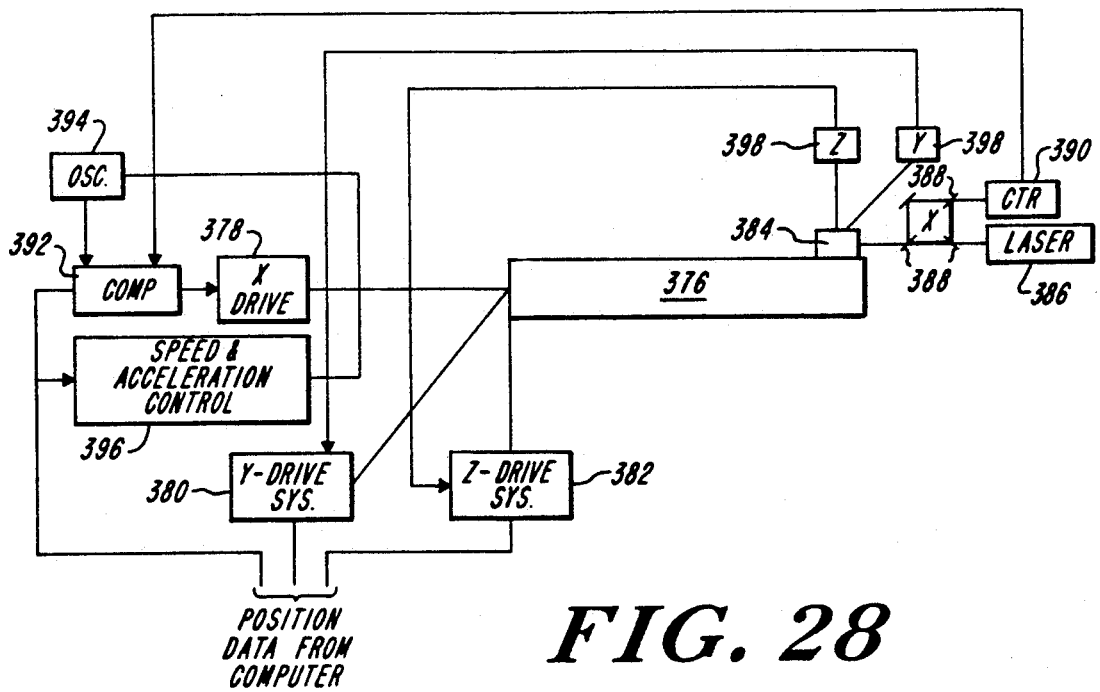
FIG. 28 is a diagrammatic view of a motion control system for the machining center of FIG. 27 illustrating interferometric position monitoring and control.

The motional control in X, Y and Z direction of the diamond cutting bit with respect to the mirror surface may alternatively be interferometrically controlled as illustrated in FIG. 28. As shown there a support platform 376 is provided on which the desired blank to be machined into a specularly reflecting mirror may be mounted. X, Y and Z drives 378, 380 and 382 are provided to motionally control the position of the support 376 in X, Y and Z directions. On one corner of the support 376 is a retro reflector module 384 which is operative to provide retro reflection of incident laser radiation in X, Y and Z directions. For simplicity of illustration the complete system is shown only with respect to the X direction, the same components being utilized for both Y and Z directions.

A laser 386 is provided and applies a laser beam to the retro reflecting components of the mirror assembly 384 through a set of beam splitters 388. Returning radiation is combined through the beam splitters 388 with the incident radiation and applied to a interference ring counter 390. The counter 390 accurately tracks the motion of the support 376 to a fraction of a wavelength of the incident laser radiation. This positional information is provided from the counter 390 to a digital comparator 392 which operates on position data supplied from the computer operating in accordance with the algorithm of FIG. 26. The comparator 392 identifies whether the support 376 is to be driven in the X direction in which polarity and accordingly passes drive pulses from an oscillator 394 to the X drive or stepper or motor 378. Speed and acceleration control information, also received from the computer, is applied to a speed and acceleration controller 396 which controls the rate of pulses from the oscillator 394 to produce a velocity, acceleration and deceleration profile such as that illustrated in curve 306 of FIG. 26.

As noted above, Y and Z axes interferometric monitoring is provided as well and Y and Z axes fringe counters 398 are provided with their outputs applied to the Y and Z drive systems 380 and 382 to accomplish the same Y and Z directional drive control as illustrated above with respect to the X drive system.

Figure 29:
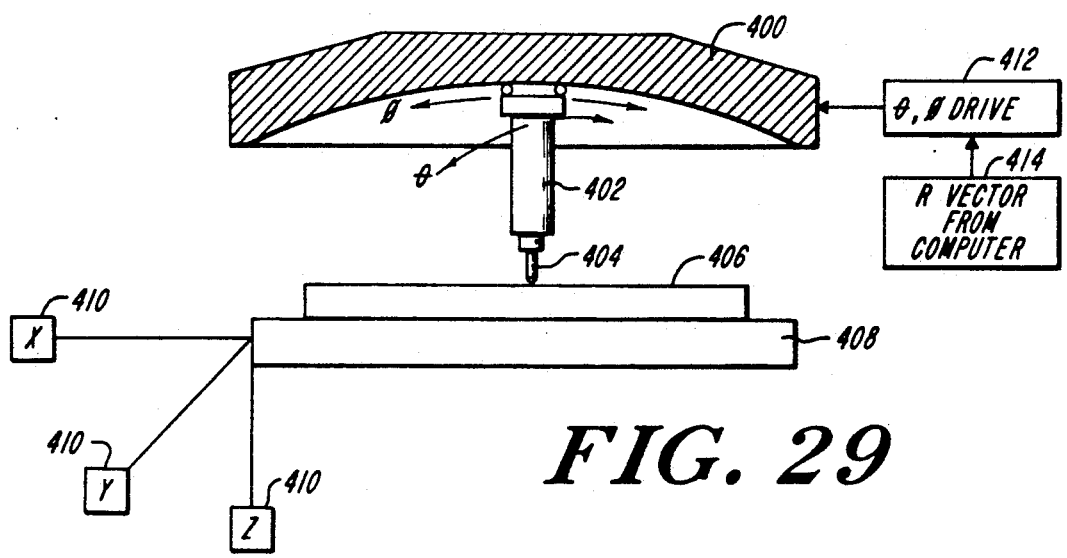
FIG. 29 is a diagrammatic view of a machining center incorporating a machine tool tilt control for use in the present invention.

It is alternatively desirable to provide a rotational mount for the machining bit as illustrated in FIG. 29 in order to control its orientation with respect to the curved surface of the mirror being produced. For this purpose, a goniometric mount 400 is provided from which a rotator 402 for a diamond bit 404 is supported. The goniometric support permits the bit to be rotated about its point of cut in contact with the metal blank 406 being machined into a mirror surface. In addition to controlling X, Y and Z locations or positions of a support 408 for the blank 406 via X, Y and Z drives 410, the computer also provides positioning information for locating the rotator 402 with respect to the goniometric support 400 through motor drives 412 which controls theta and phi positioning orientations for the rotator 402. The theta and phi information is obtained from R vector angle information generated by the computer processing in the algorithm of FIG. 26 using angle detecting circuitry 414. In essence this drives the rotator 402 along the goniometric support 400 to a point where its theta and phi matches the R vector for the mirror at that point, ensuring orthogonality of the bit at all points. Alternative, angular orientations other than orthogonality may be maintained or varied according to some prescribed formulae using the apparatus of FIG. 29.

Figure 30:
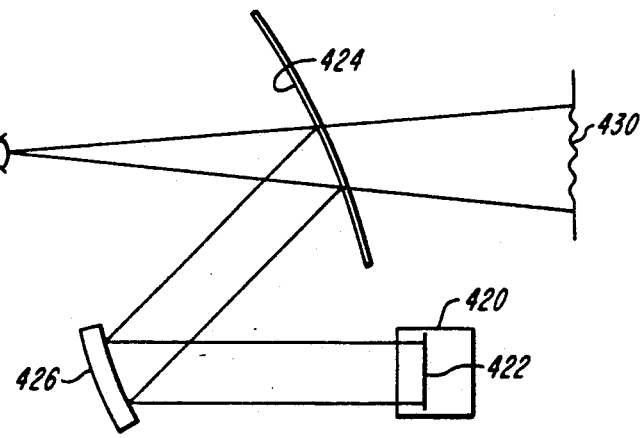
FIG. 30 is a diagrammatic view of a mirror used in the head-up display which can be created in accordance with the programming of the present invention.

Mirrors produced in accordance with the present invention can accomplish a wide range of optical transformation functions. Indeed many optical transformations requiring complex refractive elements can be accomplished with a single reflector having a compound reflecting surface the parameters of which can be designed using the design technique of the present invention. In particular, FIG. 30 illustrates a heads up display in which a projection system 420 is provided in which a transparency 422 is to be projected onto and reflected by the surface of a windshield 424 by a reflection from a particular complex mirror 426 for observation by an eye 428 of an observer. Because the windshield 424 will have a complex curve, a fair amount of distortion will be introduced by the inner reflecting surface of the windshield 424. To compensate for this so that the virtual image 430 of the transparency 422 appears in proper orientation and proportions, a mirror of complex shape must be designed, according to the present invention, to accomplish the functions of the mirror 426, for example, utilizing the reiterative field of view simulation and ray tracing programs among others provided with respect to FIG. 10.

Figure 31:
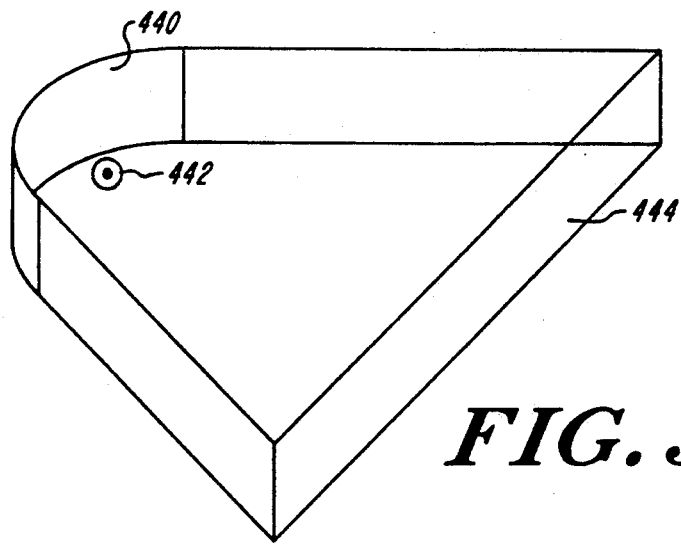
FIG. 31 is a diagram of a headlamp mirror reflector application for mirrors generated in accordance with the present invention.

In other applications reflectors are used in headlamp assemblies to define a desired projection intensity pattern, in part to meet certain government restrictions. Often it is necessary to utilize a refractive or Fresnel type front lens in the headlight assembly in order to accomplish the desired intensity pattern. Such a lens adds significant costs to the headlamp and in many cases are dedicated as either a right or left hand lamp lens, complicating replacement. In addition, because of the difficulty in designing a combination of a reflector and a lens to accomplish a specific and required intensity profile the number of available headlamps is minimized thus limiting flexibility in automative design. Utilizing the present invention, it is possible to design a reflector, such as the reflector 440 illustrated in FIG. 31, to project from a lamp 442 of predetermined filament dimensional characteristics, an intensity field 444 which can be tailored, without a front refractive lens, to any desired form utilizing the reflector surface generating techniques of the present invention and, for example, the simulation programs for reflector operation to develop ray trace intensity profiles across the illumination field 444. With reiterative steps varying the mirror profile it is possible to finalize a mirror profile that will achieve a desired intensity function in a very limited time and then to in fact grind a surface which will form a mold pattern for the production of multiple reflectors to accomplish that objective.

Figure 32:
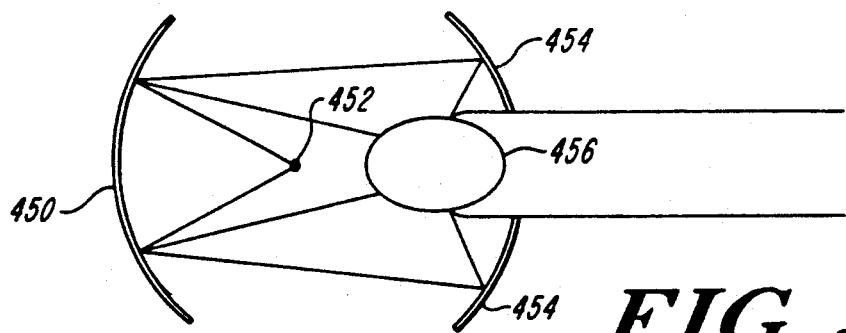
FIG. 32 is a diagram of a headlamp reflector using multiple reflector surfaces according to the present invention.

FIG. 32 illustrates a more complex form of headlamp refractor system in which not only is there is a back reflector 450, provided for light from a source 452, but additional side reflectors 454, and a central reflector 456 may be provided, and designed according to the present invention to achieve very specific intensity profiles. The surfaces 450 and 454 are typically conic surfaces made in surfaces of revolution while the surface 456 has typically axial symmetry in the form of a conic section as well. Such a compound shape is useful in the control of dispersion for example.

Figure 35:
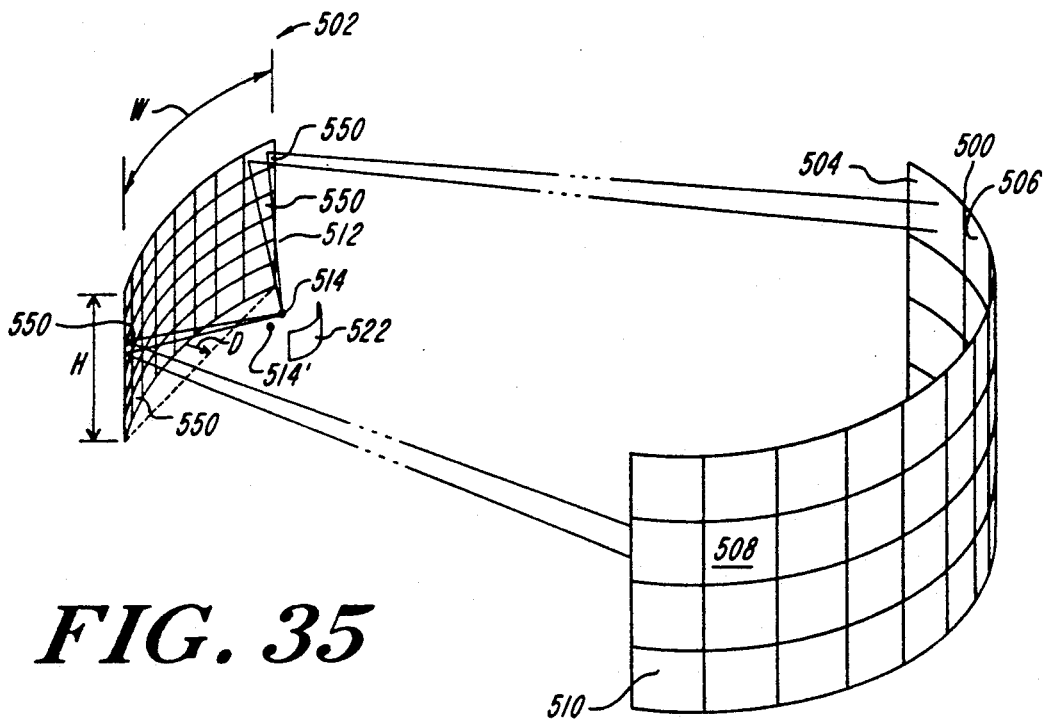
FIG. 35 is a pictorial diagram illustrating the definition of a headlamp reflector according to the present invention.
Figure 36:
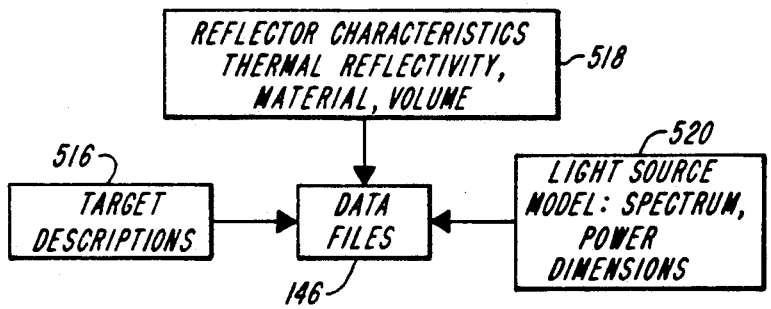
FIG. 36 is a modification to FIG. 10 for use in the definition of a headlamp according to FIG. 35.
Figure 37:
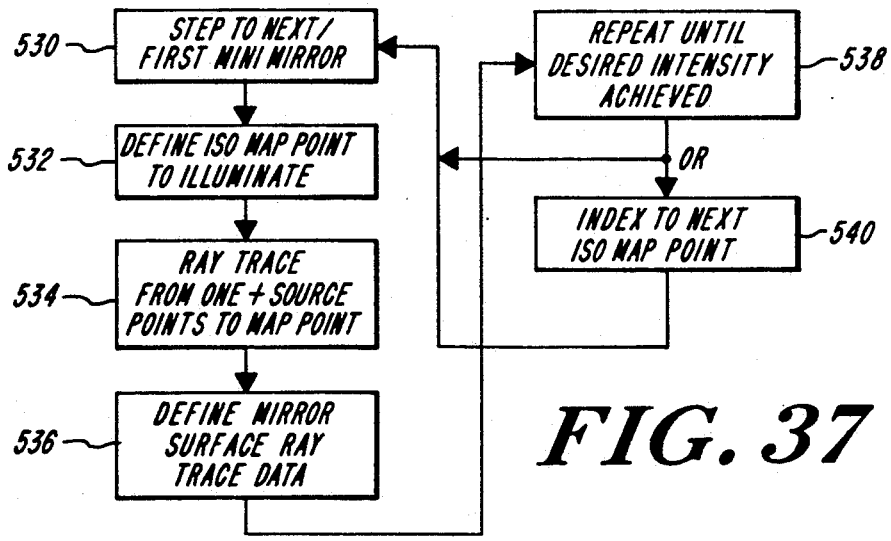
FIG. 37 is a flow chart of steps used in designing a headlamp reflector.

FIGS. 35, 36 and 37 illustrate the design of headlamp reflectors utilizing the present invention. In particular, as noted here and above, headlights are designed under U.S. law in order to achieve an illumination pattern on an "iso candella map" of minimum intensity levels as specified by Federal regulation. In the past the design of automobile headlamps to satisfy these iso map intensity requirements has been a difficult and time-consuming undertaking thereby limiting the variety of headlamp designs available. The front-end designs of automobiles into which headlamp must fit is correspondingly limited along with the flexibility of design innovation in combination with aerodynamic efficiency. Prior headlamp designs have typically utilized a parabolic reflector partially surrounding a filamentary source of light radiation, with the requisite intensity pattern of the iso map accomplished by a lens of complex refractors on the headlight. The use of the refractor pattern in the headlamp lens adds to the cost and complexity of the headlamp and limits its design flexibility.

The refractor design technique of the present invention, utilizing a plurality of adjacent mini mirrors, produces an automotive headlamp a reflector in which the reflector alone provides a radiation pattern matching that required at the iso map. In particular, and as shown in FIG. 35, an iso map or 500 is shown representing the manner in which headlamp intensity is specified. The Iso map 500 typically represents a surface, the points of which are located at varying distances from the general location of a headlamp 502.

The iso map 500 includes a plurality of locations 504, 506 . . . 508 . . . 510, each having a requiste light intensity which must be satisfied when a headlamp 502 illuminates the map 500. According to the present invention, a reflector 512 for the headlamp 502 will be designed utilizing the mini mirror 550 surface generation technique, beginning with basic specifications for the reflector 512, including horizontal width W, vertical height H, and total depth D. In addition, a filament 514 is provided and used to illuminate, by reflection off of the reflector 512, the iso map 500.

FIG. 36 illustrates the addition of data sources to the computational capability illustrated in FIG. 10 above, for use in designing a headlamp reflector. In particular, target description data 515's entered into the data files 146 to provide information regarding the requisite intensity topology of the iso map 500. In addition, input data 518 specifies the reflector 512 not only in terms of dimensions but its reflectivity characteristics, and to the extent applicable, additional features such as thermal expansion which may be used to compensate for reflector behavior in the presence of an energized filament 514. In addition, input data 520 is provided respecting the characteristics of the filament or light source 515 including its frequency spectrum, power output and physical dimensions.

The data entered through elements 516, 518, 520 may be either by keyboard entry or by entry from magnetic media.

In order to direct substantially all of the life from the filament 514 onto the iso map 500 and avoid spurious illumination outside the field of desired headlamp intensity, a back reflector 522 is provided to redirect all radiation forward of the filament 514 back toward the reflector 512.

The actual surface of the reflector 512 is designed mini mirror by mini mirror as in the previously described mirror generation system. In particular, each region 504 . . . 510 of the iso map 500 has its intensity requirements achieved by defining a plurality of mini mirrors, each with radiation from the filament 514 directed towards the region 504 until the requisite intensity in that region is achieved. At this point the next region 506 of the iso map 500 is illuminated by adjusting the mini mirror surface to direct radiation from the filament 514 to that zone 506 until its intensity requirement has been achieved or exceeded. The process continues in this manner until the entire surface 512 of the mirror is generated.

FIG. 37 shows a generalized form of flow chart processing to accomplish this definition of the reflector shape. In particular, in an initial step 530 each mini mirror, is identified in sequence across the surface of the reflector 512 in both Y and X directions as described above. From each mini mirror, step 532 defines the corresponding zone of the iso map to be illuminated from that mini mirror. With the mini mirror and the iso map zone defined in steps 530 and 532, subsequent step 534 establishes the geometric ray trace vectors from the filament 514 to the corresponding iso map zone or point. The normal to the mini mirror surface and thereby the actual shape, and orientation, and three-dimensional space of that mini mirror is accomplished in subsequent step 536. This process, according to step 538, is repeated until the desired intensity for that particular iso map location is achieved. If the intensity profile is achieved, through step 540 processing proceeds to the next iso map location. From either step 538 or step 540 processing returns to step 530.

The location of each point or zone in the iso map 500 is defined in three-dimensional space relative to the height, width and depth dimensions of the mirror 512 and of the filament 514 by data entered into the data files 146. With these geometrical arrangements, and the definition of each mini mirror location along the reflector 512 in the same three-dimensional space coordinants, the ray trace between filament and iso map is accomplished using conventional geometric relationships, as described above. According to this technique, the reflector 512 is built step-by-step or mini mirror-by-mini mirror and at the same the requisite intensity profile for the iso map 500 achieved.

The ray trace program 160 and picture files 156 of FIG. 10 are utilized to store a pictorial representation of the spot pattern of ray terminations on the iso map 500 for the design of a particular reflector 512. Additional pictures can be generated for that design utilizing a variety of points from the filament 514, accounting for its finite physical dimensions. The assemblage of pictures for a plurality of such filament points can be computer superimposed, using, for example, different colors or graphic symbols for each picture, to provide a more complete picture of the intensity profiling accomplished from a realistic filament dimension. In addition, the same technique can be utilized to provide an iso map picture in the files 156 corresponding to an alternate filament 514', representing a high beam filament.

In accomplishing the illumination of each region of the iso map 500, the set of mini mirrors utilized for that section illumination can be grouped into mirror segments 550, each operating to illuminate the same iso map region. The system provides flexibility in defining the number of segments utilized and the picture files is utilized to provide a sequence of pictures for iso map topology of intensity for a variety of segment definitions. At the same time, the focusing effect for individual ray trace impact on the iso map 500 are similarly represented and colors may be utilized in the picture presentation to indicate the degree of focus.

As described above, a very sophisticated and powerful system for developing a headlamp reflector is presented which using incremental adjacent mirror concepts of the present invention permits the rapid generation and definition of an entire reflector shape and the analysis of the resulting intensity and ray trace spot characteristics for specified filament dimensions or alternate filament dimensions.

Figure 33:
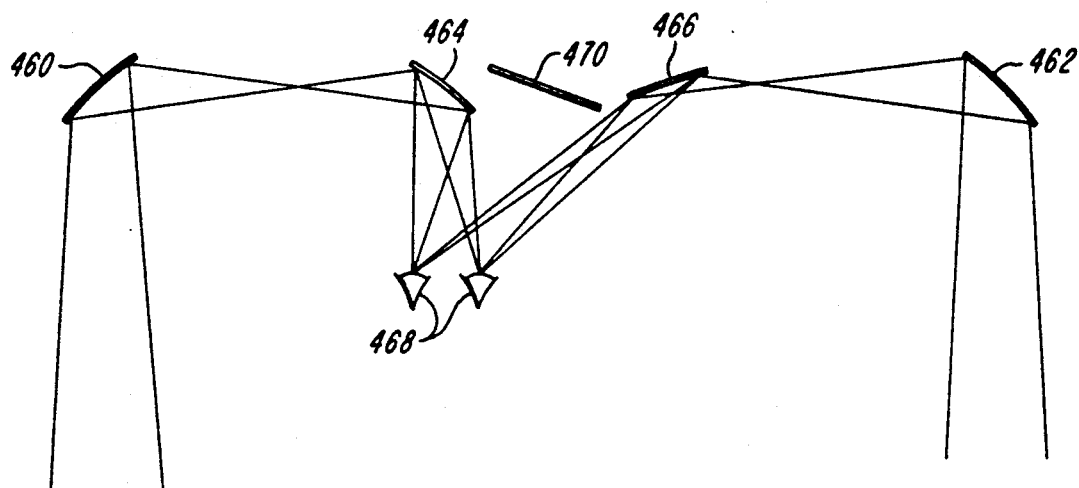
FIG. 33 is a diagram of a rear view mirror and mirror reflector system in which mirrors designed according to the present invention are useful.

FIG. 33 illustrates an application in the vehicular field in which side rear view mirrors 460 and 462 for the left and right hand vehicle sides are combined with interior relay reflectors 464 and 466 respectively to present to a viewer 468 an image corresponding to that normally seen directly in the side view mirrors but in a location, for example adjacent to the normal interior rear view mirror 470, for ease of operator's perception. Each of the reflectors 460-466 will be of complex shape in order to accomplish the presentation of an upright and in focus image with the predetermined magnification profiles to accomplished the desired wide angle viewing. By utilizing the design system of the present invention, represented by FIG. 10, it is possible to rapidly design the surfaces for the mirrors 460-466 and then to cut surfaces corresponding to them from which the actual mirrors can be produced.

Figure 34:
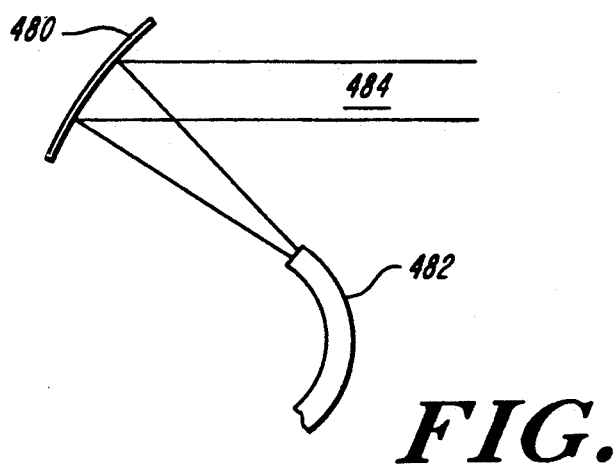
FIG. 34 is a diagram of an off-axis radar antenna application for a reflector according to the invention.

A further, example of the manner in which the present invention may be utilized to produce mirrors of compound shape useful in achieving sophisticated optical or electromagnetic transformations is illustrated in FIG. 34 in which a radar antenna is provided comprising a compound reflector 480 designed according to the present invention and an off-axis microwave feed 482. Using ray trace techniques of the present invention, the contours of a reflector 480 to provide an output beam 484 of microwave energy of desired vertical and horizontal dimensions is easily achieved using the ray trace simulations of the present invention. This avoids the problems of using a center fed radar antenna which, while easier to design using conventional techniques, is a less efficient technology. The complex shapes required for off-axis reflectors such as reflector 480, while they have existed in the prior art, are not readily achieved due to the difficult nature of specifying such a complex reflective surface.

Figure 38:
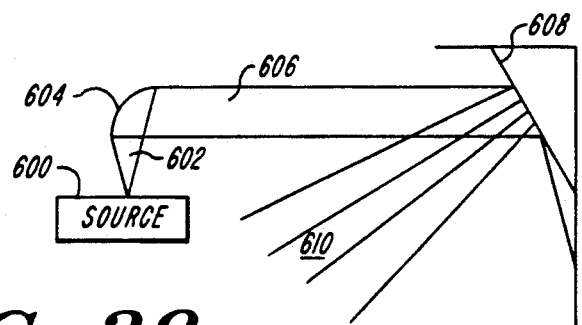
FIG. 38 illustrates the use of the invention in interior lighting systems.
Figure 39:
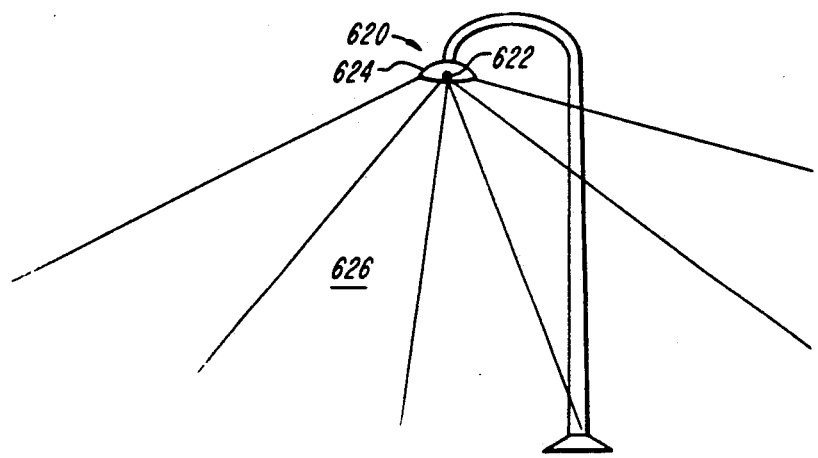
FIGS. 39 and 40 illustrate the use of the invention in outside area lighting.
Figure 40:
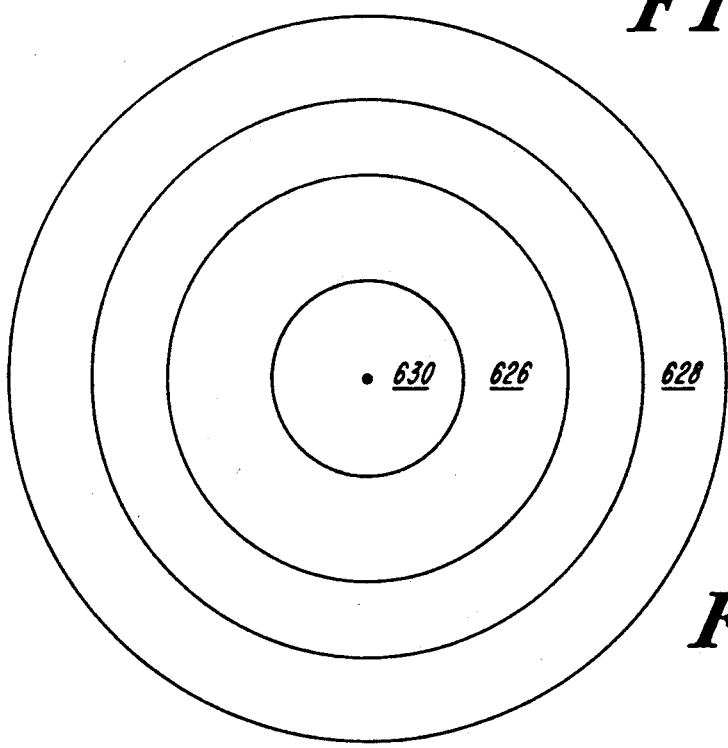

FIGS. 38, 39 and 40 illustrate the application of the invention to the generation of reflector shaped used to produce interior and exterior lighting patterns. In FIG. 38 a source 600 provides a beam 602 toward a reflector 604 which in turn provides a fan-shaped or pancake beam 606. The beam 606 is intercepted by a diffuse reflector 608 in upper peripheral corner or borders of a room to reflect the light into an intensity pattern 610, illuminating substantial portions of a room. The mirror 604 is designed according to the mini mirror and ray trace approach described above to accomplish a desired profile of illumination in the pattern 610. In this manner diffuse illumination coming from many directions can be achieved using a single source 600 by a complex reflector 604 shape.

In FIGS. 39 and 40 a parking lot lamp 620 has a central source 622 and surrounding reflector 624 that together produce an illumination pattern 626. The view of FIG. 40 illustrates the pattern 626 as shining on the pavement. Using the mini mirror and ray trace design techniques of the invention, the intensity profile can be set to produce an intensity in peripheral portions 628 which is as bright as in a central portion 630. Since pattern control permits a few lights to provide full illumination of an exterior area without the need to use costly, tall lighting poles.

Figure 41:
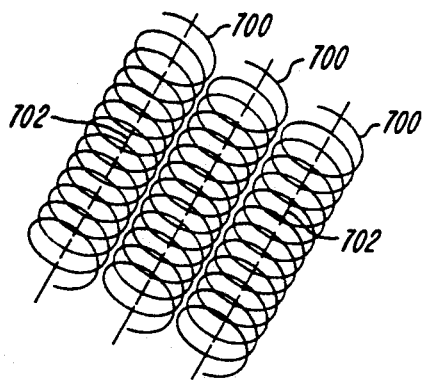
FIG. 41 is a diagram of a modulated tip pattern according to the invention.
Figure 42:
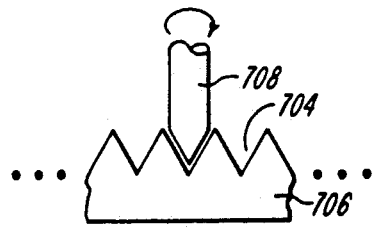
FIG. 42 is a sectional view of tip machining grooves.
Figure 43:
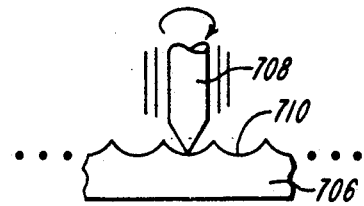
FIG. 43 is a sectional view of modulated tip machining grooves.

In the above described embodiment in which a reflector or mirror surface 352 is machined according to a set of computer generated instructions with a rapidly rotating diamond tip, it is advantageous to superimpose on the relative motion between the tip and the mirror 352 a small modulation motion in order to smooth out the grooves created by the passage of the tip over the mirror. As shown in FIG. 41 such a modulation may take the form of a cusp shaped groove pattern 700 over the surface of the mirror rather than following directly the path of straight grooves 702. As illustrated in FIG. 42 machining in straight grooves will produce a set of deep grooves 704 in a plate 706 being machined by a high speed rotating diamond tip 708. While the groove to groove spacing may be made a fraction of a wavelength and thus limit the effect upon imaging, a greater reflector efficiency can be achieved by smoothing out the grooves as shown in FIG. 43 with a modulation of the tip 708 as illustrated in FIG. 41. As shown there the plate 706 has been machined with a modulation applied to the position of the tip 708 relative to the plate 706 causing a predetermined relative motion, a modulation or dither. The result is a smoothing out of the machined grooves into more shallow depressions 710. The modulation applied or superimposed on the relative motion between the tip 708 and plate 706 can be circular, triangular, elliptical, or a more complex lissajous type of pattern to provide a more complete smoothing of the machined groove.

Figure 44:
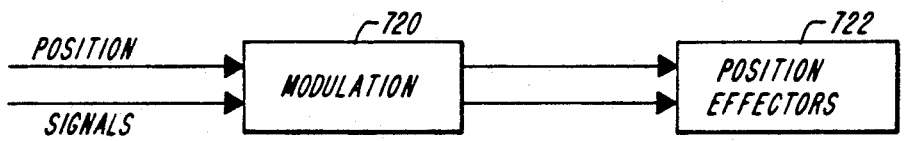
FIG. 44 is a diagram of a modulating system.

The manner in which the modulation is applied between tip 708 and plate 706 can take several forms including software or hardware realization. FIG. 44 provides a generalized view of such a system for creating modulation. As shown there position signals which may be either within the sofware or external electrical signals, prior to energization of motion or position effectors for producing relative motion between tip and plate, are applied to a modulation system 720 that generates one or more axis modulation orthogonal to the surface and plate 706. Modulated position signals are then applied to position effectors 722 which may be the X, Y, Z drives, or position effectors in the goniormetric support for the diamond tip. Techniques for producing circular, triangular or lissajous type modulation are well known and need no further description.

Figure 45:
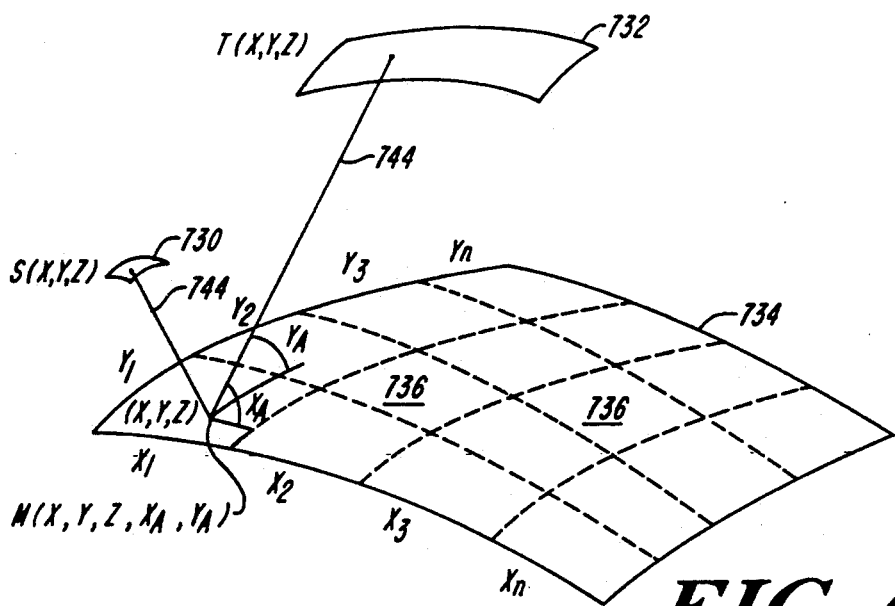
FIG. 45 is a diagram of a ray tracing from source to target via mirror segments describing the invention.

The above description of a system for producing a mirror by diamond tip machining of any underlying mirror blank or mold plate and simulating mirror images has illustrated one preferred embodiment in which a mirror, of varying radius of curvature, is fabricated in a manner to provide controlled segment to segment transitions. In general, the system of the present invention concerns itself with a transformation between a source and a target using a mirror designed according to operator specifications for the manner in which illumination from the source is applied to the target, either for image forming or for energy profiling, in the case of headlights and other illuminating devices. Such a system is generalized in FIG. 45 in which a source 730 may either be a field of view to be imaged upon a target 732 or a source of illumination the energy of which is to be arranged in a predetermined intensity pattern at the target 730 in each case using a reflector 734. Each point of the source 730 is characterized by an X, Y, Z coordinate or a function S(X, Y, Z). Similarly each point on the target 732 is characterized by a point in X, Y, Z space, T(X, Y, Z).

The mirror or reflector 734 is divided into a large number of extremely small segments 736 each of which has an associated X, Y, Z coordinate as well as an X and Y angle, XA-YA, associated with it. Therefore each segment which, may typically be square but can conceptually be of any polygonal shape, is characterized by the expression M(X, Y, Z, XA, YA). The present invention utilizes a computer generation of the reflector surface 734 in order to realize the desired transformation of the image or illumination of the source 730 onto the target 732 by tracing rays between point or points of the source 730 and points of the target 732 in a manner to accomplish the operator specified presentation of source information onto target plane. There are in general no constraints upon the shape of size of the source, target or mirror planes, nor is it required that each microsegment 736 necessarily smoothly transition to its neighboring segment.

Figure 46:
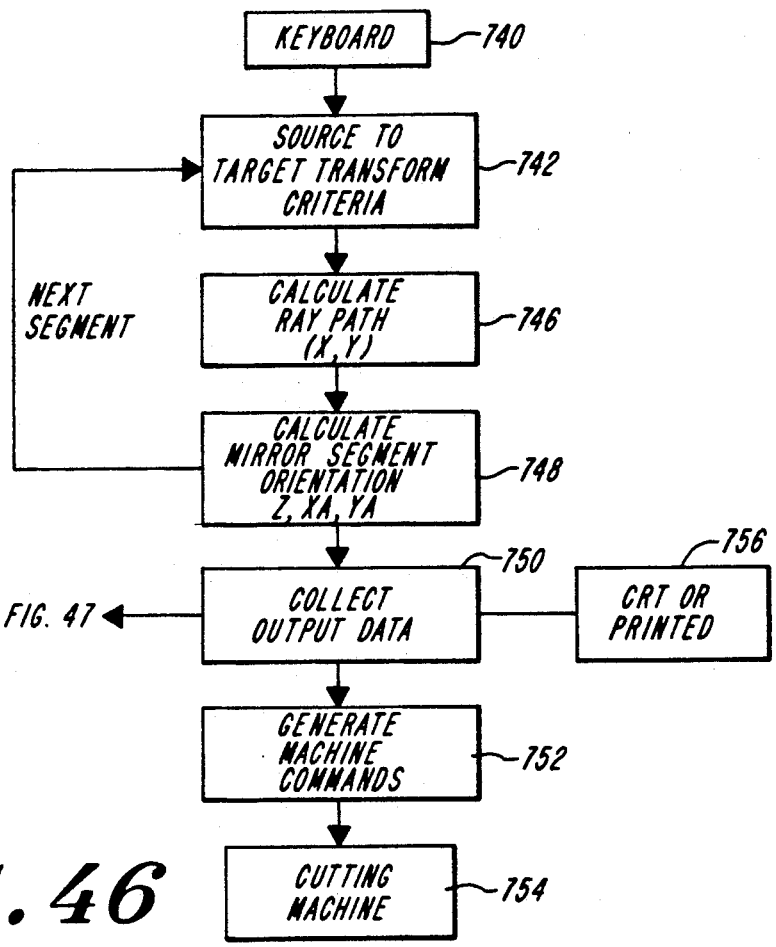
FIGS. 46 and 47 are flow charts useful in mirror and image generation according to the invention.

With reference to FIG. 46 the implementation of this methodology, one specific example of which is illustrated above, commences with keyboard input in a step 740 of an operator desired transformation between source and target under the reflectance of a mirror surface 734. That transform information is assembled in a step 742 as source-to-target transform criteria. From this criteria an innerative computer process traces rays, such as rays 742 in FIG. 45, from source 730 to target 732 under the reflectance of one microsegment 736 of the mirror 734. The innerative loop includes a step 746 which identifies an X, Y mirror segment 736 to be used for the particular point in the source 730 and target 732 between which light is to be imaged by that segment. In a subsequent step 748, the segment orientation in Z, XA and YA is calculated, using ray trace technology as is known in the art, to accomplish that transformation between the X, Y, Z coordinates of the point at the source and the coordinates at the point at the target. From step 748 the routine loops back to step 742 until the entire transformation between source and target has been accomplished (i.e., each segment 736 oriented).

In the case where the source is an image which is to be mirrored for specular viewing at the target plane 732, the ray tracing algorithm will segment the source and targets into corresponding segments and typically associate one mirror segment 736 with each ray between corrsponding source and target segments until the entire field of view in the target has been filled. In the case where an energy profiling is desired several segments 736 may be directed to trace rays from the source to more centrally located points of the target 732 than may otherwise be employed for specular image forming.

Once the entire character of the mirror 734 has been determined that data is collected in a step 750 which is in turn used in a step 752, in which machining instructions, typically like those described above, are generated so that a cutting machine 754 may execute the actual cutting of a substrate or blank to form the surface of the mirror 734.

The character of the surface 734 may similarly be provided on a CRT or printer output in a step 756 as described above.

Figure 47:
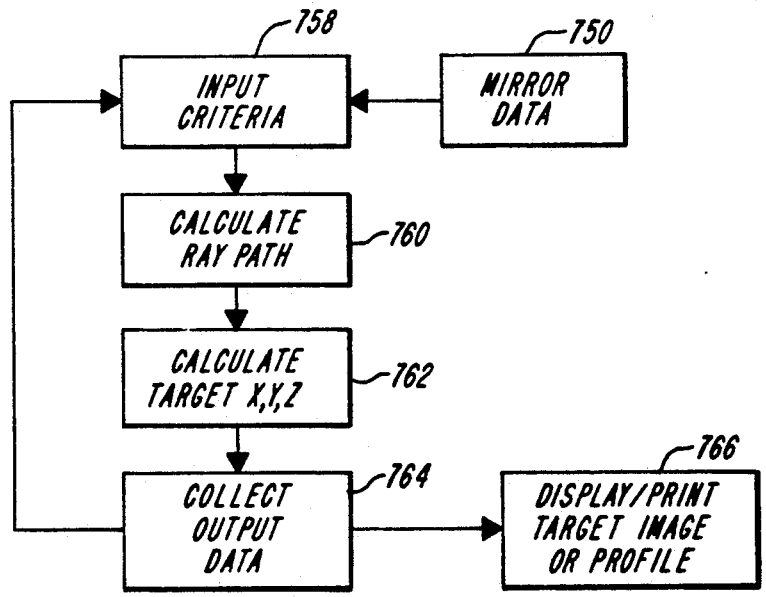

It may also be desired in the generalized system to produce a visual output of the image or energy profile as seen at the target. For that purpose a processing sequence illustrated in FIG. 47 is utilized. In that case the mirror data provided in the step 750 is assembled in a step 758. From the mirror surface data, conventional ray tracing technologies are used in steps 760 and 762 to map the surface of the source 730 via the mirror 734 onto the target 732 and to assemble the resulting data in a step 764. That data is then displayed or printed in the step 766 to provide an energy profile or an image transformation such as has been described above.

The above examples of the practice of the present invention identify how powerful a tool it is in the development of complex optical or electromagnetic transfer functions using reflectors. The above examples are intended merely to illustrate the invention and not to limit the scope which is as defined in the following claims.

ATTACHMENT A (Prog. 8)

```
20   'PLOT MACHINE CURVE 30 OCT 85 RWW (COMBO 3)*******XYZ+PRINTER+SCREEN
40   'FOR PLOTTER :A>MODE COM1:2400,N,8,2,P
60                :A>MODE LPT1:=COM1
80   'FOR PRINTER :A>MODE LPT1:1
100  SCREEN 2 :SCREEN 0,0,0,0, :CLS:KEY OFF
120  LPRINT CHR$(15):WIDTH"LPT1:",132 :'******PRINTER
140  RAD=57.29577951#
160  LPRINT "PROPRIETARY O.P.Inc. "  :'******PRINTER
180  PRINT "PROPRIETARY O.P.Inc. "
200  LPRINT DATE$,TIME$              :'******PRINTER
220  INPUT "XS,DX,XM"; XS ,DX ,XM
240  INPUT "YS,DY,YM"; YS ,DY ,YM
260  XWO=SM-XS:YWO=YM-YS:XXS=XS:YYS=YS
280  INPUT "XRMIN,XRMAX";XIN,XAX
300  INPUT "YRMIN,YRMAX";YIN,YAX
320  INPUT "XC,YC,SG1";SC,YC#,SG#
340  INPUT "SCALE SCREEN X38,Y16,Z1";SXX,XYY,SZZ
360  INPUT "SCREEN OFFSET X20,Y20";XO,YO
380  INPUT "MACHINE OFFSET-X-Y";XXX,YYY
400  INPUT "DELAY ";DTW
420  INPUT "WANT CC(0) OR CX(1): ";CCW
440  INPUT "XYZ MACHINE ON(1)/OFF(0): ";XYZ
460  IF XYZ=0 THEN 560
480  GOSUB 2740                      :' INITIALIZE XYZ MACHINE
500  IF XS<0 THEN 520 ELSE GOSUB 3960
520  IF YX<0 THEN 540 ELSE GOSUB 4080
540  IF ZS>0 THEN GOSUB 4200
560  YG=YW0+DY:YH=-DY :SG=SG# :YC=YC#
580  XV =XS:YP#=YS:ZM=0 :SN=0
600  LPRINT XXS;DX;ZM;YYS;DY;YM
620  LPRINT XIN;XAX;YIN;YAX
640  LPRINT XC;YC;SG
660  LPRINT SXX;SYY;SZZ
680  LPRINT X0;Y0
700  LPRINT DTW ,XXX,YYY
720  LPRINT
740  '**********MATH POWER RATIO MODULE********
760  XN=XAX :RX#=XAX :YN=YAX :RY=YAX :AR=RX#/RY
780  RD-XAX/XIN    :YR=YAX/TIN
800  LRD=LOG(RD) :LRY=LOG(YR)
820  MW=XM-XS
840  ST=MW/DX
860  PW=LRD/ST    :PY=LRY/ST
880  NP=EXP(PW)   :PN=EXP(PY)
900  '*************   ****END***************
920  LOCATE 21,1
940  LPRINT NP,PN
960  LPRINT
980  LPRINT"XV","RX","RY","YP","ZC","SAG","TZ","LZ"
1000 LPRINT
1020 SZ=0 :RX1#=RX# :N=0:'XN=SN*NP  :YN=YN*PN
1040 'LPRINT ";:D A EC1 CG 'A','B' CS
1060 CLS : SCREEN 2
1100 LOCATE 21,1:PRINT XAX"X"XIN;TAB(12);YAX"Y"TIN;TAB(24);"WIDTH";XWO;TAB(34);
     "HEIGHT";YWO;TAB(44);"SAG";SG#;TAB(54);"X,Y,Z";SXX;SYY;SZZ
1120 IF SQ =0 THEN 1180
1140 XV=XV+DX
```

```
1160  RX#XN/NP :RY=YN/PN
1180  AR=RX#/RY
1200  '************LOCUS OF RADIUS MODULE*******
1220  'LPRINT "*************"
1240  IF SW =0 THEN RO#=RX#
1260  N=N+1
1280  RDR#=RO#-RX#
1300  SX=RDR#*SIN(AA)
1320  GOSUB 5280
1340  SZ#=RDR#*BX#
1360  QX=QX=SX
1380  QZ=QZ+SZ#
1400  IF SQ=0 THEN QZ=0
1420  H1=(N*DX)-QX
1440  K#=H1/RX#       :'********SQR CALC
1460  KK#=(-K#*K+1#)
1480  A#=1:B#=0
1500  SS#=((KK#/A#)+A#)/2#
1520  PP#=SS# :A#=SS#
1540  SS#=B#-A#
1560  IF ABS(SS#)<=ABS(1E-17) THEN 1600
1580  B#=A# :GOTO 1500
1600  ASS#=PP#        :'********END
1620  AA=ATN(K#/ASS#)
1640  RO#=RX#         :RX=RX#
1660  LA=RAD*AA
1680  IF SW=0 THEN LZ#=RX1#
1700  LPRINT XV,RX,RY,YP,ZC,SAG,TZ,LZ
1720  ZT=TZ
1740  LZ#=(RX#*BX#)+QZ              :TZ=RX1#-LZ#
1760  '***************END********************
1780  ZN=RX# :YN=RY
1800  '***RADIUS MODULE ****************
1820  RN#=RY                    :' RN=NEW RAD
1840  ZD3=RY+ZT-SG#             :'NEW DEPTH TO RADIUS
1860  LOCATE 22,1:PRINT XV,TAB(15);"RX";RX;TAB(28);"RY";RY;TAB(41);"TX";TX;TAB(60
      );"ZS";ZS
1880  YRR#=YC#-YP#
1900  XX#=(RN#*RN#)-(YRR#*YRR#)   :'*****SQR CALC
1920  A#=1:B#=0
1940  S#=((XX/A#)+A#)/2#
1960  P#=S#
1980  A#=S#
2000  S#=B3-A3
2020  IF ABS(S#)<(1E-17) THEN GOTO 2060
2040  B#=A#       :GOTO 1940
2060  '          ********** END CALC
2080  ZS#=P#-ZD#   :ZS=ZS#
2100  IF ZS#<=0 THEN ZS#=0
2120  ZC#=SG#-ZS#: ZC=ZC#
2140  ZP=XV-(SZZ*ZC) :SAG=SG-TZ
2160  PX +(SZZ*38*XP)+X0 : PY =(SYY*16*YP#)+YO
2180  LINE-(PX,PY)                  'PLOT LINE
2200  A=INT(1000*XP)+1000 :B=INT(1000*YP#)+1000
2220  YP=YP#:LZ=LZ#
2240  IF YP +YC THEN LPRINT "YP-YC";YP,"ZC";ZC#,"RY";RY,"ZC-TZ";ZC#-TZ,"TZ";TZ
2260  IF YP+YC THEN VZ=ZC#-TZ
2280  IF YP =YG THEN LPRINT "YP-YG";YP,"ZC";ZC#,"YG-YG";YG-YH
2300  IF YP=YG THEN WZ=ZC#-TZ:LPRINT "SAGC";WZ-VZ,RN#;YG-YH;SGG;WZ-VZ-SGG
2320  IF YP =YH THEN LPRINT "YP-YH";YP,"ZC";ZC#,"TZ";TZ,"ZC-TZ";ZC#-TZ
2340  'SGA#=(RN#*RN#)-(((YG-YH)/2#)*((YG-YH)/2#))
2380  'S#=((SGA#/A#)+A#)/2# :D#=S#:S#=B#-A3
```

```
2400  IF ABS(S#)< =ABS(1E-17) THEN GOTO 2440
2420  'B#=A#:'GOTO 2380
2440  'SGG=RN#-D#:'LPRINT"SA";SGG;RN#;YP,YG-YH;"**A-C";SGG-(WZ-VZ);ZC#;TZ
2460  IF XYZ=0 THEN 2500
2480  GOSUB 3140 'MOVE MACHINE
2500  'LPRINT "D";A;",";B
2520  YP#=YP#+DY
2540  IF YP# > YM THEN 2620          ' CHECK Y MAX
2560  IF YP#< YS THEN 2660           ' CHECK Y MIN
2580  IF XV > XM THEN 2720           ' CHECK X MAX
2600  GOTO 1860
2620  YP#=YP#-DY:DY=-DY              ' CHANGE SIGN
2640  SW=1 :GOTO 1120
2660  YP#YP#-DY:DY=-DY
2680  GOTO 1120
2700  '*************** END *************
2720  LPRINT DATE$,TIME$:BEEP:BEEP:END
2740  DEF SEG=&HC000 'SET UP MACHINE
2760  GPIB = 0
2780  A%=0
2800  FLG% = 0
2820  BRD% = &H300
2840  CMD$ = "SYSCON MAD=3,CIC=1,NOB=1,BAO=768"
2860  CALL GPIB(CMD$,A%,G%,BRD%)
2880  '
2900  IF FLG%00 THEN 3780
2920  CMD$="OUTPUT 1,2,4[$%]'
2940  C$="R 253"+CHR$(13)
2960  CALL GPIB(CMD$,C$,FLG%,BRD%)
2980  C$="S 27"+CHR$(13)
3000  CALL GPIB(CMD$,C$,FLG%,BRD%)
3020  C$="F 20"+CHR$(13)
3040  CALL GPIB(CMD$,C$,FLG%,BRD%)
3060           +CHR$(13)
3080  CALL GPIB(CMD$,C$,FLG%,BRD$)
3100  G$,"G"+CHR#(13)
3120  RETURN
3140  'START "MOVE MACHINE" SUBROUTINE
3160  ******* X MOVE
3180  SZ1=XV-SX2:SX2=XV:XIW=INT(SZ1*250000!)
3200  IF XIW< =50000! THEN GOSUB 3900 ELSE GOSUB 4260
3220  '
3240  SY1YP-SY2:SY2=YP:YIW=ABS(INT(SY!*250000!))
3260  YS1=SGN(SY!):IF YS1 >=0 THEN CY$="+"+CHR(13) ELSE CY$="-"+CHR$(13)
3280  SZ1=ZC-SZ2:ZC:SZ3=ABS(SZ1):ZIW=INT(SZ3*250000!+,5)
3300  IF CCW=1 THEN 3360
3320  ZS1=SGN(SZ1):IF ZS1  =0 THEN CZ$="+"+(13) ELSE CZ$="+CHR$(13)
3340  GOTO 3380
3360  ZS1=SGN(SZ1):IF ZS1  =0 THEN CZ$="-"+CHR$(13) ELSE CZ$="+"+CHR$(13)
3380  IF YIW > 0 THEN 3460
3400  IF ZIW< =50000! THEN GOSUB 3940 ELSE GOSUB 4540
3420  RETURN
3440  '
3460  YAW=0
3480  IF ZC> =.000004 THEN 3560
3500  IF YIW< =50000! THEN GOSUB 3920 ELSE GOSUB 4400
3520  RETURN
3540  '
3560  FOR ZAW=1 TO ZIW
3580  YOW=INT((ZAW*YIW/ZIW)-YAW)
3600  YAW=YAW+YOW
3620  '
```

```
3640  ZNW=1
3660  GOSUB 5080
3700  GOSUB 4880
3720  NEXT ZAW
3740  RETURN
3760  '
3780  PRINT",,,FLAG";HEX$(FLG%)
3800  LPRINT DATE$,TIME$
3820  BEEP:BEEP:BEEP:END
3840  XNW=XIW:GOSUB 4680:RETURN
3860  YOW=YIW:GOSUB 4880:RETURN
3880  ZNW=ZIW:GOSUB 5080:RETURN
3900  XNW=XIW:GOSUB 4680:RETURN
3920  YOW=YIW:GOSUB 4880:RETURN
3940  ZNW=ZIW:GOSUB 5080:RETURN
3960  XIW=INT(XS*250000!)-XXX
3980  IF XIW< 0 THEN CX$="-"+CHR$(13) ELSE CX$="+"+CHR$(13)
4000  XIW=ABS(XIW)
4020  IF XIW< =50000! THEN GOSUB 3840 ELSE GOSUB 4260
4040  CX$="+"+CHR$(13)
4060  RETURN
4080  YIW=INT(YS*250000!)-YYY
4100  IF YIW< 0 THEN CY$="-"+CHR$(13) ELSE CY$="+"+CHR$(13)
4120  YIW=ABS(YIW)
4140  IF YIW< =50000! THEN GOSUB 3860 ELSE GOSUB 4400
4160  CY$="+"+CHR$(13)
4180  RETURN
4200  ZIW-INT(ZS*250000!)
4220  IF ZIW< =50000 THEN GOSUB 3880 ELSE GOSUB 4540
4240  RETURN
4260  FOR XMW = 1 TO XIW-50000! STEP 50000!
4280  XNW = 50000!
4300  GOSUB 4680
4320  NEXT XMW
4380  XNW=XIW-XMW
4360  GOSUB 4680
4380  RETURN
4400  FOR YMW = 1 TO YIW-50000! STEP 50000!
4420  YOW = 50000!
4440  GOSUB 4880
4460  NEXT YMW
4480  YOW = YIW - YMW
4500  GOSUB 4880
4520  RETURN
4540  FOR ZMW = 1 TO ZIW-50000! STEP 50000!
4560  ZNW=50000!
4580  GOSUB 5080
4600  NEXT ZMW
4620  ZNW=ZIW-ZMW
4640  GOSUB 5080
4660  RETURN
4680  CC$="N"+STR$(XNW)+CHR$(13):'******** X MOVE
4700  CMD$="OUTPUT 1[$%]"
4720  CALL GPIB(CMD$,CC$,FLG%,BRD%)
4740  CALL GPIB(CMD$,CX$,FLG%,BRD%)
4760  CALL GPIB(CMD$,G$,FLG%,BRD$)
4780  DTW=XNW*.3
4800  FOR TX= 1 TO DTW : NEXT TX: TX=0 '******** X DELAY
4820  IF LEFT$(CX$,1)="+" THEN XDD=XDD+XNW ELSE XDD=XDD-XNW
4840  LOCATE 3,60,0:PRINT "X = ";XDD;
4860  RETURN
```

```
4880 SS$="N"+STR$(YOW)+CHR$(13);' ******** Y MOVE
4900 CMD$="OUTPUR 2[$%]"
4920 CALL GPIB(CMD$,SS$,FLG%,BRD%)
4940 CALL GPIB(CMD$,CY$,FLG%,BRD%)
4960 CALL GPIB(CMD$,G$,FLG%,BRD%)
4980 DTW=YOW*.3
5020 IF LEFT$(CY$,1)="+" THEN YDD=YDD+YOW ELSE YDD=YDD-YOW
5040 LOCATE 4,60,0:PRINT "Y=";YDD;
5060 RETURN
5080 E$="N"+STR$(ZNW)+CHR$(13):' ******** Z MOVE
5100 CMD$="OUTPUT 4[$%]"
5120 CALL GPIB(CMD$,E$,FLG%,BRD%)
5140 CALL GPIB(CMD$,CZ$,FLG%,BRD%)
5160 CALL GPIB(CMD$,G$,FLG%,BRD%)
5180 DTW=ZNW*.3
5200 FOR TZZ=1 TO DTW : NEXT TZZ: TZZ=0 ' ******** Z DELAY
5220 IF LEFT$(CZ$,1,)="+" THEN ZDD+ZDD+ZNW ELSE ZDD=ZDD-ZNW
5240 LOCATE 5,60,0:PRINT "Z=";ZDD;
5260 RETURN
5280 Z#=AA
5300 Z#=2:B3=24:C#=720:D#=40320!:E#=3628800!
5320 F#=479001600#:G#=87178291200#
5340 BX=1-((X#^2)/A#)+(X#^4)/B#)-((X#^6)/C#)+((X#^8)/D#)-((X#^10)/E#)+((X#^12)/F#)-((X#^14(/G#)
5360 RETURN
```

What is claimed is:

1. A process for forming a reflector for providing a beam of light of prescribed intensity profile from a source of known, nonzero dimensions, comprising the steps of:

dividing said prescribed intensity profile into a plurality of minute target regions;

computer-defining a reflector shape as a matrix of reflector segments in edge-to-edge juxtaposition, which matrix is comprised of columns of segments arrayed in one vector direction x and rows of segments arrayed in a second vector direction y which is orthogonal to direction x, by assigning to each segment curve-defining parameters spacially relative to the source and to each target region of said prescribed intensity profile, which parameters comprise x and y minimum, center and maximum values, x and y radius range values, and x and y step size values between reflector segments;

computer-entering curve-describing formulae for said reflector segments in both x and y directions;

computer-entering formulae identifying radius change from maximum to minimum values;

computer-processing said parameters and said formulae for each reflective segment;

preparing a reflective surface from said computer-processed curve-defining parameters, which surface will provide said profile from said source; and determining machining steps for the control of a machine tool center to replicate the reflector surface.

2. A process for forming a reflector for providing a beam of light of prescribed intensity profile from a source of known, nonzero dimensions, comprising the steps of:

dividing said prescribed intensity profile into a plurality of minute target regions;

computer-defining a reflector shape as a matrix of reflector segments in edge-to-edge justaposition, which matrix is comprised of columns of segments arrayed in one vector direction x and rows of segments arrayed in a second vector direction y which is orthogonal to direction x, by assigning to each segment curve-defining parameters spacially relative to the source and to each target region of said prescribed intensity profile, which parameters comprise x and y minimum, center and maximum values, x and y radius range values, and x and y step size values between reflector segments;

computer-entering curve-describing formulae for said reflector segments in both x and y directions;

computer-entering formulae identifying radius change from maximum to minimum values;

computer-processing said parameters and said formulae for each reflective segment;

preparing a reflective surface from said computer-processed curve-defining parameters, which surface will provide said profile from said source;

specifying the input/output characteristics of an optical system including at least one reflector;

determining reflector surface shape from the specified characteristics;

providing a computer-output display depicting a visual representation corresponding to light beamed from said source, reflected by said computer-defined reflector shape, and targeted onto said prescribed intensity profile;

determining machining steps for the control of a machine tool center to replicate the reflector surface; and reproducing by molding the reflector surface from the machine tool replicated surface.

3. A process of formulating a surface of a reflector comprising the steps of:

computer-defining, in spatial relation to a source of reflection and a target of reflection, the size and curvature parameters of a matrix of reflector segments, which matrix is comprised of columns of segments arrayed in one vector direction x and rows of segments arrayed in a second vector direction y which is orthogonal to vector direction x;

computer-processing said size and curvature parameters of the segments at their peripheral boundaries in such a manner that the radius of curvature parameter of the reflector segments in orthogonal directions at main segment boundaries lie in the same vector direction for each boundary; and providing by computer generated controls from said parameters of the reflector surface segments an output physical manifestation of the reflector surface.

4. The process of claim 3 wherein said providing step includes simulating reflector performance from the computer-processed parameters.

5. The process of claim 4 wherein said simulation step includes identifying mirror anamorphism.

6. The process of claim 4 wherein said simulation step includes determining mirror field of view along orthogonal axes of mirror segments.

7. The process of claim 4 wherein said simulation step includes providing a two-dimensional representation of the three-dimensional mirror shape.

8. The process of claim 4 wherein said simulation step includes providing a simulated image of a field of view for an observer.

9. The process of claim 4 wherein said simulating step further includes generating from said parameters a ray tracing of the operation of said mirror between image and object locations.

10. The process of claim 4 wherein said simulation step includes providing a computer display of two-dimensional representations of said simulation.

11. The process of claim 4 wherein said simulation step includes printing the representation of said simulation.

12. The process of claim 4 and further comprising:
altering the reflector segment specifying information; and
repeating the defining and simulating steps for each alteration step.

13. The process of claim 3 which further comprises generating a surface in a solid material corresponding in shape to the computer-defined three-dimensional reflector surface.

14. The process of claim 13 wherein said step of generating a reflector surface includes machining a material in accordance with the defined reflector surface.

15. The process of claim 14 wherein said machining step includes machining with a high speed diamond bit.

16. The process of claim 15 wherein said diamond bit is rotated at least ten thousand revolutions per minute.

17. The process of claim 14 wherein said machining step includes controlling machining bit orientation relative to the surface being machined.

18. The process of claim 17 wherein said predetermined relationship is one in which the bit is disposed in an orthogonal manner to the surface being machined.

19. The process of claim 14 wherein said machining step comprises machining said material in grooves and modulating the machining of the grooves to produce a smoothed groove.

20. The process of claim 19 wherein said modulating step includes modulating in accordance with a pattern selected from the group consisting of circular, triangular, elliptical, and lissajous patterns.

21. A reflector provided according to the process of claim 3.

22. A process for formulating a reflector for use with a light source to produce a preset intensity profile for an illumination pattern by reflection of light from said source via said reflector, said process comprising the steps of:

providing computer accessible data identifying said illumination pattern, source location parameters, and reflector location parameters;

computer-defining, in spacial relation to the location of said source and to the location of said illumination pattern, the size and curvature parameters, according to the computer accessible data, of each portion in a matrix of reflector portions, which matrix is comprised of columns of portions arrayed in one vector direction x and rows of portions arrayed in a second vector direction y which is orthogonal to vector direction x;

said defining step operative in association with source and reflector data to define a portion size sufficient to illuminate each segment of said illumination pattern with an intensity at least matching said intensity profile;

and providing by computer generated controls from the defined reflector portions an output physical manifestation of a reflector comprised of the defined reflector portions.

23. The process of claim 22 wherein at least some of said reflector portions comprise plural mirror elements, each element oriented to reflect light from said source to the same illumination pattern segment.

24. The process of claim 22 wherein said defining step includes ray tracing between the source, reflector, and intensity profile.

25. The process of claim 22 wherein said reflector includes plural separate reflector surface for providing a plurality of reflections.

26. A reflector provided according to the process of claim 22.

27. A process for formulating an optical transform surface in accordance with a predetermined optical transformation for transforming light from a source to a target, comprising the steps of:

computer-defining said optical transform surface as a matrix of surface segments, said matrix comprised of columns of segments arrayed in one vector direction x and rows of segments arrayed in a second vector direction y which is orthogonal to vector direction x;

computer-tracing rays corresponding to the light from a source location, reflected by corresponding surface segments, and targeted upon corresponding target location in accordance with the predetermined optical transformation whereby source, transform surface, and target points are positionally associated by said trace rays;

computer-determining the orientation for each surface segment positionally and angularly in order to cause light to be reflected along a traced ray corresponding to each positionally associated source, transform surface segment, and target point; and providing by computer generated controls from the defined transform surface an output physical manifestation of the defined transform surface.

28. The process of claim 7 further including the step of machining a substrate according to the determined orientation of surface segments to produce in a surface of said substrate a surface having segments oriented according to said determined orientation of mirror segments.

29. The process of claim 28 wherein said machining step includes machining said substrate with a high speed diamond bit.

30. The process of claim 28 wherein said machining step includes machining with superimposed modulation to smooth out grooves incident in said machining step.

31. The process of claim 30 wherein said superimposed modulation is selected from the group consisting of circular, triangular, elliptical, and lissajous pattern.

32. The process of claim 27 which further includes: presenting for operator viewing an image corresponding to an image in a plane containing said plural target locations created by optical transform by the determined orientation of surface segments of illumination from said source.

33. The process of claim 32 wherein said step of presenting an image includes the step of tracing rays between the source and the target corresponding to each of said surface segments.

34. The process of claim 27 wherein the target is represented as a predetermined three-dimensional object.

35. The process of claim 27 wherein the orientation of said surface segments is operative to reproduce an image of the sources at the target.

36. The process of claim 27 wherein said surface segments are oriented to be operative to produce a predetermined energy profile at said target in response to a radiation emanating from said source.

* * * * *

UNITED STATES PATENT AND TRADEMARK OFFICE
CERTIFICATE OF CORRECTION

PATENT NO. : 5,096,281

DATED : March 17, 1992

INVENTOR(S) : Robert W. Windebank, et al.

It is certified that error appears in the above-indentified patent and that said Letters Patent is hereby corrected as shown below:

Column 2, line 66, "path typical encoun-" should read --path typically encoun- --.

Column 4, line 41, "formulation" should read --formation--.

Column 5, line 28, "view mirror" should read --view mirrors--.

Column 7, line 52, "mini mirror" should read --mini mirrors--.

Column 8, line 60, "direction" should read --directions--.

Column 11, line 18, "completer" should read --complete--.

Column 12, line 32, "curvature 24" should read --curvature 224--.

Column 12, line 41, "face" should read --fact--.

Column 12, line 60, "front-desk" should read --front-back--.

Column 14, line 37, "tem 184" should read --tem 164--.

Column 14, line 57, "through it" should read --though it--.

Column 18, line 4, "Iso map" should read --iso map--.

Column 20, line 25, "shaped" should read --shapes--.

UNITED STATES PATENT AND TRADEMARK OFFICE
CERTIFICATE OF CORRECTION

PATENT NO. : 5,096,281
DATED : March 17, 1992
INVENTOR(S) : Robert W. Windebank, et al.

It is certified that error appears in the above-indentified patent and that said Letters Patent is hereby corrected as shown below:

Column 31, line 57, "curve-defining" should read --curve-describing--.
Column 36, line 14, "sources" should read --source--.

Signed and Sealed this

Tenth Day of January, 1995

Attest:

BRUCE LEHMAN

Attesting Officer    Commissioner of Patents and Trademarks